US011586698B2

(12) United States Patent
Butcher et al.

(10) Patent No.: US 11,586,698 B2
(45) Date of Patent: Feb. 21, 2023

(54) TRANSFORMING COLLECTIONS OF CURATED WEB DATA

(71) Applicant: Microsoft Technology Licensing, LLC, Redmond, WA (US)

(72) Inventors: Aaron Michael Butcher, Redmond, WA (US); Daniel John Krenn, Seattle, WA (US); Steven Michael McMurray, Maple Valley, WA (US); Steven Oliver Lengieza, Seattle, WA (US); Silvana Patricia Moncayo, Seattle, WA (US); Laurentiu Titi Nedelcu, Redmond, WA (US); Puneet Arora, Hyderabad (IN); Pramod Nammi, Hyderabad (IN); Akshansh Choudhary, Hyderabad (IN); Kurian Jacob, Kerala (IN); Vikas Verma, Hyderabad (IN); Vikram Singh, Hyderabad (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/377,968

(22) Filed: Jul. 16, 2021

(65) Prior Publication Data

US 2021/0342416 A1 Nov. 4, 2021

Related U.S. Application Data

(63) Continuation of application No. 16/537,032, filed on Aug. 9, 2019, now Pat. No. 11,093,575.

(51) Int. Cl.
*G06F 17/00* (2019.01)
*G06F 16/958* (2019.01)
(Continued)

(52) U.S. Cl.
CPC .......... *G06F 16/972* (2019.01); *G06F 3/0482* (2013.01); *G06F 16/953* (2019.01);
(Continued)

(58) Field of Classification Search
CPC .... G06F 16/986; G06F 16/176; G06F 16/958; G06F 2203/04805; G06F 3/0486;
(Continued)

(56) References Cited

U.S. PATENT DOCUMENTS 7,519,573 B2 * 4/2009 Helfman ............... G06F 16/958
7,542,958 B1 * 6/2009 Warren .................. G06Q 10/10
706/48

(Continued)

OTHER PUBLICATIONS

"Non Final Office Action Issued in U.S. Appl. No. 16/537,125", dated Aug. 19, 2021, 14 Pages.
(Continued)

*Primary Examiner* — Laurie A Ries

(57) ABSTRACT

In non-limiting examples of the present disclosure, systems, methods and devices for surfacing collected web content are presented. A collection of web content may be maintained, wherein the collection of web content is divided into a plurality of sections, each of the plurality of sections comprising a subset of web content from a different webpage. An indication to export the collection of web content to a productivity application may be received. A plurality of attributes that each of the plurality of sections have a value for may be identified. A productivity application document may be populated with the plurality of attributes and the corresponding values from each of the sections.

20 Claims, 24 Drawing Sheets

Related U.S. Application Data

(60) Provisional application No. 62/842,856, filed on May 3, 2019.

(51) Int. Cl.

| | | |
|---|---|---|
| *G06F 16/955* | (2019.01) | |
| *G06N 20/00* | (2019.01) | |
| *G06F 16/957* | (2019.01) | |
| *G06F 3/0482* | (2013.01) | |
| *H04L 67/02* | (2022.01) | |
| *G06F 16/953* | (2019.01) | |
| *G06F 40/18* | (2020.01) | |
| *H04L 9/40* | (2022.01) | |
| *H04L 67/146* | (2022.01) | |
| *G06F 40/14* | (2020.01) | |
| *G06V 30/413* | (2022.01) | |
| *H04L 65/402* | (2022.01) | |
| *G06F 3/0486* | (2013.01) | |

(52) U.S. Cl.
CPC ........ *G06F 16/955* (2019.01); *G06F 16/9562* (2019.01); *G06F 16/9566* (2019.01); *G06F 16/9577* (2019.01); *G06F 16/986* (2019.01); *G06F 40/14* (2020.01); *G06F 40/18* (2020.01); *G06N 20/00* (2019.01); *G06V 30/413* (2022.01); *H04L 63/105* (2013.01); *H04L 65/4025* (2022.05); *H04L 67/02* (2013.01); *H04L 67/146* (2013.01); *G06F 3/0486* (2013.01); *G06F 2203/04803* (2013.01)

(58) Field of Classification Search
CPC ..................... G06F 40/14; G06F 40/18; G06F 2203/04803; G06F 16/972; G06F 16/953; G06F 16/955; G06F 16/9562; G06F 16/9566; G06F 16/9577; G06F 3/0482; G06N 20/00; G06Q 30/06; G06V 30/413; H04L 67/146; H04L 63/105; H04L 65/4025; H04L 67/02
See application file for complete search history.

(56) References Cited

U.S. PATENT DOCUMENTS

| | | | |
|---|---|---|---|
| 7,613,993 B1 * | 11/2009 | Baer ..................... G06F 40/131 | 707/999.001 |
| 7,788,274 B1 | 8/2010 | Ionescu et al. | |
| 7,962,512 B1 * | 6/2011 | Sholtis .................. G06F 16/256 | 707/777 |
| 9,262,784 B2 | 2/2016 | Shi | |
| 9,336,290 B1 | 5/2016 | Truher | |
| 9,529,791 B1 * | 12/2016 | Zheng ................... G06F 40/186 | |
| 9,836,774 B2 | 12/2017 | Kirovski et al. | |
| 9,904,737 B2 | 2/2018 | Yoon | |
| 10,067,965 B2 | 9/2018 | Lev et al. | |
| 10,534,851 B1 | 1/2020 | Chan et al. | |
| 10,540,153 B2 * | 1/2020 | Stachura .................. G06F 8/38 | |
| 10,546,009 B2 | 1/2020 | Gallé et al. | |
| 10,789,315 B1 * | 9/2020 | Zoller .................. G06F 40/221 | |
| 10,997,256 B2 | 5/2021 | Liang et al. | |
| 2005/0021611 A1 * | 1/2005 | Knapp ................ G06F 16/9535 | 707/E17.109 |
| 2006/0026196 A1 * | 2/2006 | Lau ........................ G06F 16/289 | 707/999.102 |
| 2008/0162275 A1 | 7/2008 | Logan et al. | |
| 2008/0184138 A1 * | 7/2008 | Krzanowski ........ G06F 16/9562 | 715/760 |
| 2008/0270444 A1 * | 10/2008 | Brodie .................. G06F 3/0482 | 707/999.102 |
| 2009/0204478 A1 | 8/2009 | Kaib et al. | |
| 2009/0235187 A1 | 9/2009 | Kim et al. | |
| 2009/0327855 A1 * | 12/2009 | Le ........................ G06F 16/9558 | 715/230 |
| 2011/0161479 A1 | 6/2011 | Freishtat et al. | |
| 2011/0202827 A1 | 8/2011 | Freishtat et al. | |
| 2011/0238495 A1 | 9/2011 | Kang | |
| 2011/0246440 A1 * | 10/2011 | Kocks .................... G06F 16/738 | 707/706 |
| 2012/0117482 A1 * | 5/2012 | Harinarayan ....... G06F 16/9535 | 715/738 |
| 2013/0132365 A1 | 5/2013 | Chang et al. | |
| 2013/0191723 A1 * | 7/2013 | Pappas .................. G06F 40/143 | 715/234 |
| 2013/0346386 A1 | 12/2013 | Zandona et al. | |
| 2014/0026037 A1 | 1/2014 | Garb et al. | |
| 2014/0040343 A1 * | 2/2014 | Nickolov ................ H04L 69/32 | 709/201 |
| 2014/0074585 A1 | 3/2014 | Madsen et al. | |
| 2014/0280133 A1 | 9/2014 | Dulitz | |
| 2014/0281482 A1 | 9/2014 | Diamond et al. | |
| 2014/0337441 A1 | 11/2014 | Schnitman et al. | |
| 2014/0344658 A1 | 11/2014 | Akselrod | |
| 2014/0372405 A1 | 12/2014 | Lee et al. | |
| 2015/0106157 A1 * | 4/2015 | Chang ................... G06F 40/237 | 705/7.29 |
| 2015/0220492 A1 | 8/2015 | Simeonov et al. | |
| 2016/0125081 A1 | 5/2016 | Blanco et al. | |
| 2016/0267060 A1 * | 9/2016 | Skirpa .................... G06F 3/0481 | |
| 2016/0357716 A1 | 12/2016 | Douglas et al. | |
| 2017/0103102 A1 | 4/2017 | Alison et al. | |
| 2017/0357721 A1 | 12/2017 | Chernenkov et al. | |
| 2018/0137560 A1 | 5/2018 | Chopra et al. | |
| 2018/0143975 A1 * | 5/2018 | Casal ...................... G06F 40/51 | |
| 2018/0165364 A1 | 6/2018 | Mehta et al. | |
| 2018/0165375 A1 | 6/2018 | Silkey et al. | |
| 2019/0266283 A1 | 8/2019 | Shukla et al. | |

OTHER PUBLICATIONS

"Final Office Action Issued in U.S. Appl. No. 16/537,125", dated Feb. 23, 2022, 15 Pages.

"Notice of Allowance Issued in U.S. Appl. No. 16/537,125", dated Jun. 10, 2022, 12 Pages.

\* cited by examiner

FIG. 8

| D4 | Fx | | | | | | | | | | |
|---|---|---|---|---|---|---|---|---|---|---|---|
| | A | B | C | D | E | F | G | H | I | J | K | L |
| 1 | Headphone Research | | | | | | | | | | |
| 2 | Brand ▽ | Name ▽ | Color ▽ | Price ▽ | Rating ▽ | Notes ▽ | | | | | |
| 3 | Bose | ABC | Black | $485 | ★★★★★ | Text text text | | | | | |
| 4 | Bose | DEF | Black | $450 | ★★★★★ | | | | | | |
| 5 | Sony | GHI | Silver | $275 | ★★★★☆ | Text text text text text text | | | | | |
| 6 | Shure | JKL | Black | $375 | ★★★★☆ | Text text text text | | | | | |
| 7 | Grado | MNO | Pink | $500 | ★★★★☆ | | | | | | |
| 8 | Grado | PQR | Red | $295 | ★★★★★ | | | | | | |
| 9 | | | | | | | | | | | |

|   | A | B | C | D | E | F | G | H | I | J | K | L |
|---|---|---|---|---|---|---|---|---|---|---|---|---|
| 1 | Paris flights research | | | | | | | | | | | |
| 2 | Airline | Layover | Airport | Time | Price | | | | | | | |
| 3 | ABC | N | N/A | 10h32m | $1443 | | | | | | | |
| 4 | ABC | Y | AMS | 12h5m | $1465 | | | | | | | |
| 5 | XYZ | N | N/A | 10h47m | $1765 | | | | | | | |
| 6 | XYZ | Y | ORY | 13h17m | $2150 | | | | | | | |
| 7 | RRR | Y | LHR | 16h28m | $2436 | | | | | | | |
| 8 | RRR | Y | LHR | 15h42m | $1217 | | | | | | | |
| 9 | | | | | | | | | | | | |

FIG. 12

| | D4 | | Fx | | | | | | | | | |
|---|---|---|---|---|---|---|---|---|---|---|---|---|
| | A | B | C | D | E | F | G | H | I | J | K | L |
| 1 | Paris hotels research | | | | | | | | | | | |
| 2 | Hotel | Location | Size | Rating | Price | | | | | | | |
| 3 | ABC | D1 | King | ★★★★★ | $2370 | | | | | | | |
| 4 | XYZ | D7 | King | ★★★★☆ | $2200 | | | | | | | |
| 5 | QRS | D1 | King | ★★★★☆ | $2125 | | | | | | | |
| 6 | LMN | D2 | King | ★★★★☆ | $1895 | | | | | | | |
| 7 | | | | | | | | | | | | |
| 8 | | | | | | | | | | | | |
| 9 | | | | | | | | | | | | |

TRANSFORMING COLLECTIONS OF CURATED WEB DATA

RELATED APPLICATIONS

This application is a continuation of and claims priority to U.S. patent application Ser. No. 16/537,032, filed Aug. 9, 2019, entitled "Transforming Collections of Curated Web Data", which is hereby incorporated by reference in its entirety, and which claims priority to U.S. Provisional Patent Application No. 62/842,856, filed May 3, 2019, and entitled "Curation of Web Data Via an Integrated Browser Experience," which is also hereby incorporated by reference in its entirety.

BACKGROUND

The time people spend on the web has increased significantly and more activities, projects and tasks are completed online. Some activities like shopping, booking travel and learning new things are now frequently and predominately done online. However, many of these web activities require research spanning multiple browsing sessions, across multiple calendar days, often using many different websites. For these types of longer running activities and tasks, it is difficult for people to stay organized and pickup where they left off. Tools like bookmarks and favorites have become long lists of text-based URLs that are difficult to parse and use for recalling and returning to web content.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for collecting and surfacing web content in collections. According to examples, a collection tool may be integrated in a web browser application and/or a web browser service. When a webpage is navigated to in the browser, a type of that webpage may be identified for that webpage (e.g., product shopping type, travel search type, location type, etc.). If an indication is received to add the webpage to a collection, a subset of content from the webpage may be extracted from the webpage based on the identified webpage type. The extracted content subset may be saved to the collection and displayed in a collection pane integrated in the web browser. The content saved to the collection and displayed in the collection pane may be interacted with in the collection pane (e.g., rearranged, notes added, navigated to, etc.). Additional webpages may be navigated to and additional content may be added to the collection and collection pane in this manner. In examples, a collection may be shareable for collaboration with a plurality of users. In additional examples, a collection may be exported and transformed for incorporation and display in one or more other productivity applications (e.g., spreadsheet application, word processing application, email application, notes application, collaborative communication application, etc.). In some examples, when content included in a collection is modified at the source (e.g., the source webpage and/or database), the web browser application and/or web browser service may automatically update the collection. In other examples, the web browser application and/or web browser service may notify a user associated with the collection if a determination is made that web content included in a collection has been modified at the source.

BRIEF DESCRIPTION OF THE DRAWINGS

Non-limiting and non-exhaustive examples are described with reference to the following figures:

FIG. 8 illustrates the result of the utilization of a transformation engine for exporting and transforming a collection of web content from multiple websites in a first format in a collection pane of a web browser, to a second format in a spreadsheet application.

FIG. 10 illustrates the result of the utilization of a transformation engine for exporting and transforming a collection of dynamic flight content from multiple airline websites in a first format in a collection pane of a web browser, to a second format in a spreadsheet application.

FIG. 12 illustrates the result of the utilization of a transformation engine for exporting and transforming a collection of dynamic hotel content from multiple hotel websites in a first format in a collection pane of a web browser, to a second format in a spreadsheet application.

DETAILED DESCRIPTION

Figure 1:
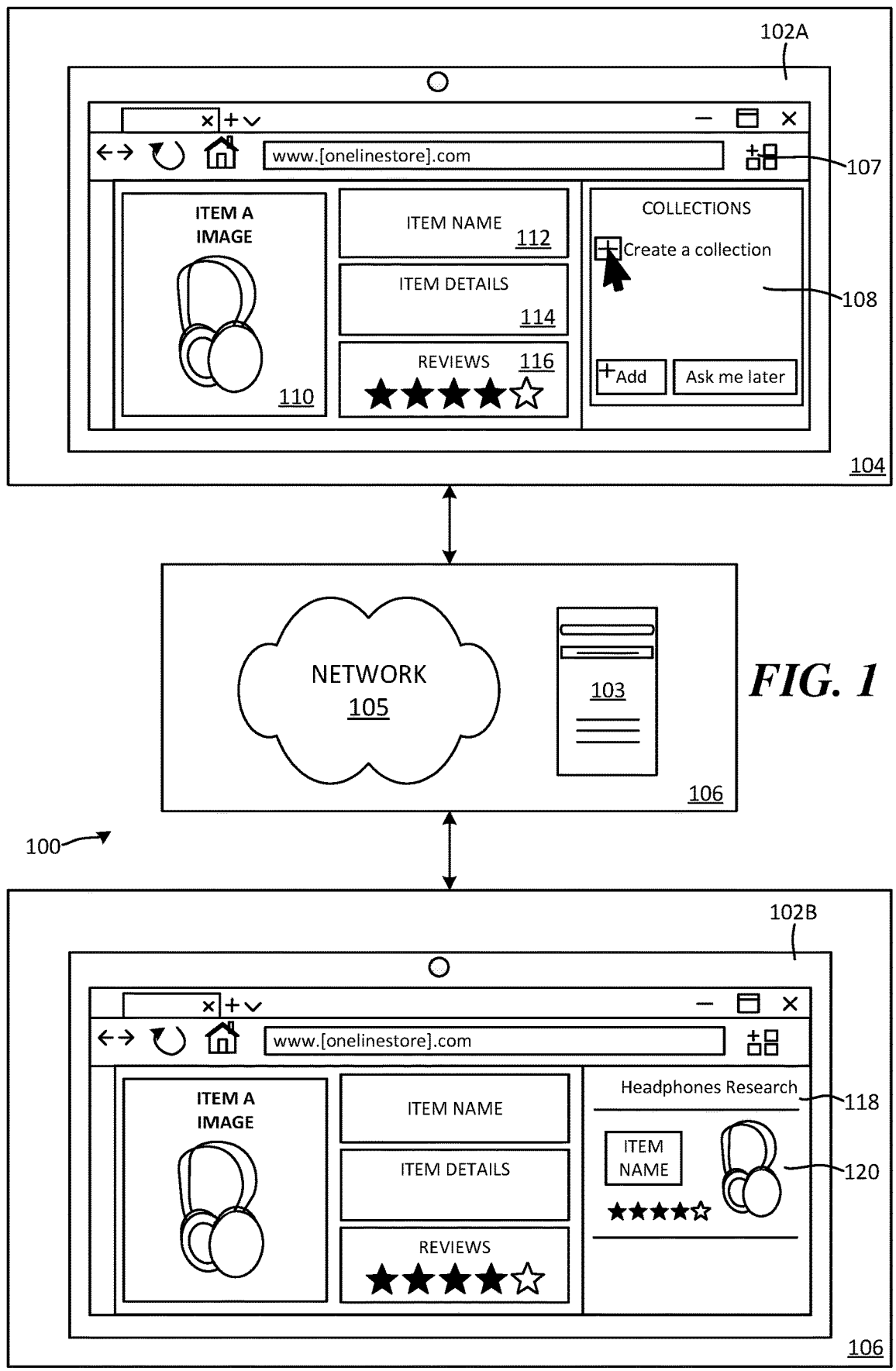
FIG. 1 is a schematic diagram illustrating an example distributed computing environment for collecting and surfacing web content from a website via a collection pane of a web browser.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Examples of the disclosure provide systems, methods, and devices for collecting web content from a plurality of websites via a content collection tool integrated in a browser. Additional aspects provide mechanisms for surfacing collected web content via a content collection pane in a web browser, exporting and transforming collected web content from the content collection tool to one or more web applications, and providing a collaborative viewing and/or editing experience where more than one user can interact with sets of collected web content.

According to examples, a subset of web content from one or more webpages may be added to a collection of web content in a content collection pane. The addition of web content from a webpage to a collection may be initiated via various mechanisms. In some examples, a web content collection tool may be interacted with to initiate the addition of web content from a webpage to a collection. In other examples, a web browser shell action and/or an operating system shell action (e.g., print screen, take screenshot, copy image, copy text, etc.) may initiate the addition of web content from a webpage to a collection. According to examples, when a web browser application and/or service receives an indication to add a subset of web content from a webpage to a collection, the web browser application and/or service may apply a set of rules corresponding to the type of webpage that is currently active to determine what subset (i.e., which webpage elements) of web content to extract and add to a collection. Examples of webpage type classifications include: shopping type, product type, travel type, flight booking type, hotel booking type, research type, dictionary type, reading type, and restaurant type, for example. Thus, if a webpage is identified as a product shopping type, elements that may be extracted and added to a collection for that webpage may comprise at least one of: a price element, a type of product element, a product image element, a name of product element, a product description element, and a product rating element. In another example, if a webpage is identified as a flight booking type, elements that may be extracted and added to a collection for that webpage may comprise at least one of: a departure airport element, an arrival airport element, a layover element, an airline element, a flight duration element, a flight price element, and a date of travel element. In yet another example, if a webpage is identified as a hotel booking type, elements that may be extracted and added to a collection for that webpage may comprise at least one of: a geographic location element, a hotel name element, a hotel image element, a type of room element, and a date of stay element. In another example, if a webpage is identified as a restaurant type, elements that may be extracted and added to a collection for that webpage may comprise at least one of: a geographic location element, a restaurant name element, a menu image element, a food image element, a type of food element, and a price element.

The web browser application and/or service may determine a content type of a webpage via various mechanisms. In some examples, the web browser application and/or service may determine a webpage type based on analyzing the HTML for the webpage and schema included therein. In additional examples, the web browser application and/or service may determine a webpage type based on analyzing tags included in a webpage (e.g., image tags, title tags, etc.). In still other examples, the web browser application and/or service may determine a webpage type based on analyzing a uniform resource locator (URL) for a webpage. In additional examples, the web browser application and/or service may perform a web search utilizing a URL for a webpage and determine the webpage type based on analyzing the resulting search results. In still other examples, the web browser application and/or service may determine a webpage type based on applying natural language processing and/or machine learning to a webpage. For example, a natural language processing model may be applied to a webpage that classifies a webpage by topics included in text therein. In another example, one or more machine learning models that have been trained to classify webpages may be applied to a webpage (e.g., webpage images, webpage layout, etc.) to determine the webpage type.

According to some examples, a collection of web content may be transformed for inclusion in a productivity application other than a web browser. Examples of productivity applications that a collection may be transformed for inclusion into include: spreadsheet applications, word processing applications, presentation applications, email applications, notes applications, and task completion applications, among others. According to some examples, when a command is received to export a collection of web content to a spreadsheet application, a plurality of attributes that each subset of web content in a collection has in common (or in some examples a threshold number and/or percentage of the subsets have in common) may be identified, and those attributes may be utilized for populating headings in the spreadsheet application. For example, if there is a collection of web content related to shopping, each subset in that collection may share a "price" attribute and a "brand" attribute. Thus, the price and brand attributes may be populated as column headings for the spreadsheet, and the values included in the collection subsets for those attributes (e.g., price values and brand values) may then be added to the cells under the headings.

According to some examples, the web browser application and/or service may add additional content to a collection. For example, the web browser application and/or service may perform web searches related to content in a collection and supplement the collection and/or an exported/transformed version of that collection (e.g., add additional products to a shopping collection, add related content to a product subset in a shopping collection). According to some examples, in identifying additional content to supplement a collection, the web browser application and/or service may apply an image recognition machine learning model to image content in a collection, and perform related searches based on the result (e.g., apply an identification machine learning model to flower images in a flower collection of web content and identify additional information related to the identified flowers that can be added to the collection; apply a facial recognition machine learning model to person images in a person collection of web content and identify additional information related to the identified persons that can be added to the collection).

According to some examples, collections may be shared and/or collaborated on amongst users. In some examples, one or more users (i.e., user accounts) may have administrative rights associated with a collection, and those users may initiate the sharing of the collection with other users. In some examples, the administrative users may share a collection with other users such that the other users have certain limitations with what they can and cannot do with a collection (e.g., view, edit, share, etc.). In some examples, a collection may be shared via a link in an electronic message. For example, if collection link is selected from an email or other electronic messaging application on a computing device, the computing device may open a web browser and add/open the collection in the web browser (e.g., open the collection in a collection pane of the web browser). In other examples, a collection may be shared via a file. In some examples, a collection may be encoded in one of: a JSON format, an XML format, and a YAML format, and that collection may be embedded in an HTML file for sharing with other users.

According to aspects described herein, a method for collecting and surfacing web content is provided, the method comprising: accessing and displaying, in a web browser, first web content from a first website; receiving an indication to add a subset of the first web content to a content collection pane integrated in the web browser; displaying the subset of the first web content in the content collection pane of the web browser; accessing and displaying, in the web browser, second web content from a second website; receiving an indication to add a subset of the second web content to the content collection pane; and displaying the subset of the first web content and the subset of the second web content simultaneously in the content collection pane of the web browser. According to some examples, the subset of the first web content is identified automatically from one or more HTML tags of the first website based on a type associated with the first website. In additional examples, receiving the indication to add the subset of the first web content to the content collection pane in the web browser comprises receiving a user-selection of the subset and a subsequent drag and drop of the selected subset into the content collection pane. In some examples, receiving the indication to add the subset of the first web content to the content collection pane in the web browser comprises: receiving a command to take a screenshot of the first web content; and receiving a confirmation to add the subset of the first web content to the collection pane. In additional examples, the method further comprises receiving an indication that at least one displayable attribute of the subset of the first web content has been modified at the first website; and dynamically modifying the display of the subset of the first web content corresponding to the at least one displayable attribute in the content collection pane of the web browser. In additional examples, the method further comprises: receiving an indication that at least one displayable attribute of the second subset of the second web content has been modified at the second website; and dynamically modifying the display of the subset of the second web content corresponding to the at least one displayable attribute in the content collection pane of the web browser. In some examples, the method further comprises: receiving an indication to add a user note in association with the first web content in the content collection pane of the web browser; receiving the user note; and adding the user note to the first web content in the content collection pane of the web browser. In other examples, the subset of the first web content and subset of the second web content are ordered in a displayable arrangement in the content collection pane of the web browser based on a time that they were added to the content collection pane relative to one another. In yet other examples, the method further comprises determining a type of web content of the first web content; and identifying a plurality of elements to extract from the first web content based on the determined type. In additional examples, the plurality of elements is identified via application of a machine learning model to the first web content, the machine learning model having been trained to identify a plurality of elements corresponding to the determined type of web content.

According to additional aspects described herein, a system for collecting and surfacing web content is provided, the system comprising: a memory for storing executable program code; and one or more processors, functionally coupled to the memory, the one or more processors being responsive to computer-executable instructions contained in the program code and operative to: access and display, in a web browser, first web content from a first website; receive an indication to add a subset of the first web content to a content collection pane integrated in the web browser; display the subset of the first web content in the content collection pane of the web browser; access and display, in the web browser, second web content from a second website; receive an indication to add a subset of the second web content to the content collection pane; and display the subset of the first web content and the subset of the second web content simultaneously in the content collection pane of the web browser. According to some examples, the one or more processors are further responsive to the computer-executable instructions contained in the program code and operative to: automatically identify the subset of the first web content from one or more HTML tags of the first website based on a type associated with the first website. According to additional examples, the one or more processors are further responsive to the computer-executable instructions contained in the program code and operative to: determine a type of web content of the first web content; and identify a plurality of elements to extract from the first web content based on the determined type. In some examples, in identifying the plurality of elements, the one or more processors are further responsive to the computer-executable instructions contained in the program code and operative to: apply a machine learning model to the first web content, wherein the machine learning model has been trained to identify a plurality of elements corresponding to the determined type of web content. In additional examples, in receiving the indication to add the subset of the first web content to the content collection pane in the web browser, the one or more processors are further responsive to the computer-executable instructions contained in the program code and operative to: receive a command to take a screenshot of the first web content; and receive a confirmation to add the subset of the first web content to the collection pane. In yet other examples, the one or more processors are further responsive to the computer-executable instructions contained in the program code and operative to: receive an indication that at least one displayable attribute of the subset of the first web content has been modified at the first website; and dynamically modify the display of the subset of the first web content corresponding to the at least one displayable attribute in the content collection pane of the web browser.

According to additional aspects, a computer-readable storage device comprising executable instructions that, when executed by one or more processors, assists with collecting and surfacing web content, is provided, the computer-readable storage device including instructions executable by the one or more processors for: accessing and displaying, in a web browser, first web content from a first website; receiving an indication to add a subset of the first web content to a content collection pane integrated in the web browser; displaying the subset of the first web content in the content collection pane of the web browser; accessing and displaying, in the web browser, second web content from a second website; receiving an indication to add a subset of the second web content to the content collection pane; and displaying the subset of the first web content and the subset of the second web content simultaneously in the content collection pane of the web browser. According to some examples, the instructions are further executable by the one or more processors for: automatically identifying the subset of the first web content from one or more HTML tags of the first website based on a type associated with the first website. According to additional examples, the instructions are further executable by the one or more processors for: determining a type of web content of the first web content; and identifying a plurality of elements to extract from the first web content based on the determined type. In yet other examples, the instructions are further executable by the one or more processors for: applying a machine learning model to the first web content, wherein the machine learning model has been trained to identify a plurality of elements corresponding to the determined type of web content.

According to additional aspects described herein a method for surfacing collected web content is provided, the method comprising: maintaining a collection of web content, wherein the collection of web content is divided into a plurality of sections, each of the plurality of sections comprising a subset of web content from a different webpage; receiving an indication to export the collection of web content to a spreadsheet application; identifying a plurality of attributes that each of the plurality of sections have a value for; populating a spreadsheet with headings corresponding to each of the plurality of attributes; and populating cells under the headings with corresponding values for each of the plurality of sections. According to examples, the collection of web content has been collected utilizing a content collection pane of a web browser. In additional examples, the method further comprises: identifying a plurality of attributes associated with one or more of the sections; identifying a webpage that also has the plurality of attributes; generating a new section from a subset of web content from the webpage; and adding the new section to the collection. In other examples, the method further comprises populating cells under the headings in the spreadsheet with corresponding values from the new section. In still other examples, identifying a webpage that also has the plurality of attributes comprises performing a web database search utilizing at least one word corresponding to one of the plurality of attributes as a keyword for the search. In yet other examples, the method further comprises: identifying a webpage related to one or more of the different webpages that the subset of web content was collected from; generating a new section from a subset of web content from the webpage; and adding the new section to the collection. According to some examples, the webpage is related the one or more different webpages based on the webpage and the one or more different webpages being included in a same duration of browsing history of a threshold number of users. In other examples, the plurality of attributes comprises a price attribute. In additional examples, the method further comprises: receiving an indication that a value of the price attribute for one of the plurality of sections has been modified; and automatically repopulating a corresponding cell in the spreadsheet with the modified value. In some examples, one of the plurality of attributes comprises an item type attribute associated with the price attribute. In other examples, one of the plurality of attributes comprises a flight type attribute from a specific first airport to a specific second airport, and wherein the flight type attribute is associated with the price attribute. In additional examples, one of the plurality of attributes comprises a rating type attribute.

According to additional aspects a system for surfacing collected web content is provided, the system comprising: a memory for storing executable program code; and one or more processors, functionally coupled to the memory, the one or more processors being responsive to computer-executable instructions contained in the program code and operative to: maintain a collection of web content, wherein the collection of web content is divided into a plurality of sections, each of the plurality of sections comprising a subset of web content from a different webpage; receive an indication to export the collection of web content to a productivity application; automatically perform a web search related to one of the plurality of sections; identify content relevant to the section based on the performed web search; and populate the productivity application with content from each of the plurality of sections and the relevant content from the performed web search. According to some examples, in identifying content relevant to the section based on the performed web search, the one or more processors are further responsive to the computer-executable instructions contained in the program code and operative to: apply a machine learning model trained to identify images of a content type corresponding to the collection to an image included in one of the plurality of sections; identify, based on application of the machine learning model, a name of at least one of: a person, a place, and a thing included in the image; and perform the web search utilizing the identified name. In additional examples, the identified content relevant to the section comprises a source for quoted text included in the section, and wherein in populating the productivity application with content from each of the plurality of sections and the relevant content from the performed web search, the one or more processors are further responsive to the computer-executable instructions contained in the program code and operative to: associate a citation to the source with the quoted text in the productivity application.

According to additional aspects a computer-readable storage device comprising executable instructions that, when executed by one or more processors, assists with surfacing collected web content, is provided, the computer-readable storage device including instructions executable by the one or more processors for: maintaining a collection of web content, wherein the collection of web content is divided into a plurality of sections, each of the plurality of sections comprising a subset of web content from a different webpage; receiving an indication to export the collection of web content to a spreadsheet application; identifying a plurality of attributes that each of the plurality of sections have a value for; populating a spreadsheet with headings corresponding to each of the plurality of attributes; and populating cells associated with the headings with corresponding values for each of the plurality of sections. According to some examples, the instructions are further executable by the one or more processors for: performing a web search utilizing one or more of the plurality of attributes as keywords for the web search; identifying a webpage that includes the attribute keywords; generating a new section from a subset of web content from the webpage; and adding the new section to the collection. In additional examples, one of the plurality of attributes comprises a price attribute. In other examples, the instructions are further executable by the one or more processors for: receiving an indication that a value of the price attribute for one of the plurality of sections has been modified; and automatically repopulating a corresponding cell in the spreadsheet with the modified value.

According to additional aspects described herein, a method for sharing collected web content is provided, the method comprising: maintaining a collection of web content, wherein the collection of web content is divided into a plurality of sections, each of the plurality of sections comprising a subset of web content from a different webpage, and wherein a first user has administrative rights associated with the collection of web content; receiving, from the first user, an indication to provide a second user with access to the collection of web content; and providing the second user with access to the collection of web content. According to some examples the indication includes an access level associated with it, and the second user is provided with limited access to the collection of web content based on that indicated access level. In additional examples, the indication includes an access level associated with it, and wherein the second user is provided with viewing privileges for the collection, editing privileges for the collection, and note adding privileges for the collection based on that indicated access level. In other examples, providing the second user with access to the collection of web content comprises: encoding the collection in one of: JSON, XML, and YAML; embedding the encoded collection in an HTML file; and sharing the HTML file with the second user. In yet other examples, each section of the collection is extractable as a webpage from the encoded collection. In some examples, sharing the HTML file with the second user comprises sending a link to the HTML file to an account associated with the second user. In some examples, the link is selectable for adding one or more of the plurality of sections of the collection to a collection pane in a browser instance. In additional examples, the method further comprises: receiving an indication to add the collection of web content to a browser instance associated with the second user; adding the collection of web content to the browser instance associated with the second user; receiving a modification to the collection of web content from the browser instance associated with the second user; and modifying a corresponding collection of web content on a web browser instance associated with the first user. In yet other examples, the method further comprises: receiving, from a web browser instance associated with the first user, an indication to add a note to one of the sections of the collection of web content; adding the note to the section in the collection of web content in the web browser instance associated with the first user; and automatically adding the note to the section in the collection of web content in a web browser instance associated with the second user.

According to additional aspects, a system for sharing collected web content is provided, the system comprising: a memory for storing executable program code; and one or more processors, functionally coupled to the memory, the one or more processors being responsive to computer-executable instructions contained in the program code and operative to: maintain a collection of web content, wherein the collection of web content is divided into a plurality of sections, each of the plurality of sections comprising a subset of web content from a different webpage, and wherein a first user has administrative rights associated with the collection of web content; receive, from the first user, an indication to provide a second user with access to the collection of web content; and provide the second user with access to the collection of web content. According to some examples, the indication includes an access level associated with it, and wherein in providing the second user with access to the collection of web content, the one or more processors are further responsive to the computer-executable instructions contained in the program code and operative to: provide the second user with limited access to the collection of web content based on the indicated access level. In examples, in providing the second user with access to the collection of web content, the one or more processors are further responsive to the computer-executable instructions contained in the program code and operative to: encode the collection in one of: JSON, XML, and YAML; embed the encoded collection in an HTML file; and share the HTML file with the second user. In additional examples, the one or more processors are further responsive to the computer-executable instructions contained in the program code and operative to: extract each section of the collection as a webpage from the encoded collection. In other examples, in sharing the HTML file with the second user, the one or more processors are further responsive to the computer-executable instructions contained in the program code and operative to: send a link to the HTML file to an account associated with the second user. In still other examples, the link is selectable for adding one or more of the plurality of sections of the collection to a collection pane in a web browser. In yet other examples, the one or more processors are further responsive to the computer-executable instructions contained in the program code and operative to: receive an indication to add the collection of web content to a browser instance associated with the second user; add the collection of web content to the browser instance associated with the second user; receive a modification to the collection of web content from the browser instance associated with the second user; and modify a corresponding collection of web content on a web browser instance associated with the first user. In additional examples, the one or more processors are further responsive to the computer-executable instructions contained in the program code and operative to: receive, from a web browser instance associated with the first user, an indication to add a note to one of the sections of the collection of web content; add the note to the section in the collection of web content in the web browser instance associated with the first user; and automatically add the note to the section in the collection of web content in a web browser instance associated with the second user.

According to additional aspects, a computer-readable storage device comprising executable instructions that, when executed by one or more processors, assists with sharing collected web content, is provided, the computer-readable storage device including instructions executable by the one or more processors for: maintaining a collection of web content, wherein the collection of web content is divided into a plurality of sections, each of the plurality of sections comprising a subset of web content from a different webpage, and wherein a first user account has administrative rights associated with the collection of web content; receiving, from the first user account, an indication to provide a second user account with access to the collection of web content; and providing the second user account with access to the collection of web content. According to examples, the instructions are further executable by the one or more processors for: encoding the collection in one of: JSON, XML, and YAML; embedding the encoded collection in an HTML file; and sharing the HTML file with the second user account. In additional examples, the instructions are further executable by the one or more processors for: receiving an indication to add the collection of web content to a browser instance associated with the second user account; adding the collection of web content to the browser instance associated with the second user account; receiving a modification to the collection of web content from the browser instance associated with the second user account; and modifying a corresponding collection of web content on a web browser instance associated with the first user account.

According to additional aspects, a method for collecting and surfacing web content is provided, the method comprising: displaying, in a web browser, web content from a webpage; identifying a type associated with the webpage; receiving an indication to add a new section corresponding to the webpage to a content collection pane integrated in the web browser; identifying a plurality of elements on the webpage based on the identified type associated with the webpage; extracting a subset of web content from the webpage corresponding to the plurality of elements; and adding the new section to the content collection pane, wherein the new section comprises the subset of web content extracted from the webpage. According to some examples, identifying the type associated with the webpage comprises: analyzing HTML for the webpage; and determining a type of the webpage based on a schema included in the HTML. According to other examples, identifying the type associated with the webpage comprises applying a machine learning model that has been trained to identify webpage types to the webpage. According to additional examples, identifying the type associated with the webpage comprises analyzing a uniform resource locator for the webpage. According to some examples, identifying the type associated with the webpage comprises: providing a uniform resource locator for the webpage to a web search engine; and applying one or more machine learning models that have been trained to identify webpage types to one or more of: metadata associated with a search result; one or more images associated with a search result, and text associated with a search result. According to yet other examples, the identified type is a product shopping type, and the plurality of elements comprise at least one of: a price element, a type of product element, a product image element, a name of product element, a product description element, and a product rating element. In yet other examples, the identified type is a flight booking type, and the plurality of elements comprise at least one of: a departure airport element, an arrival airport element, a layover element, an airline element, a flight duration element, and a flight price element, a date of travel element. In still other examples, the identified type is a hotel booking type, and the plurality of elements comprise at least one of: a geographic location element, a hotel name element, a hotel image element, a type of room element, and a date of stay element. In additional examples, the identified type is a restaurant type, and the plurality of elements comprise at least one of: a geographic location element, a restaurant name element, a menu image element, a food image element, and a type of food element, and a price element.

According to additional aspects, a system for collecting and surfacing web content is provided, the system comprising: a memory for storing executable program code; and one or more processors, functionally coupled to the memory, the one or more processors being responsive to computer-executable instructions contained in the program code and operative to: display, in a web browser, web content from a webpage; identify a type associated with the webpage; receive an indication to add a new section corresponding to the webpage to a content collection pane integrated in the web browser; identify a plurality of elements on the webpage based on the identified type associated with the webpage; extract a subset of web content from the webpage corresponding to the plurality of elements; and add the new section to the content collection pane, wherein the new section comprises the subset of web content extracted from the webpage. In some examples, the one or more processors are further responsive to the computer-executable instructions contained in the program code and operative to: analyze HTML for the webpage; and determine a type of the webpage based on a schema included in the HTML. In additional examples, in identifying the type associated with the webpage, the one or more processors are further responsive to the computer-executable instructions contained in the program code and operative to: apply a machine learning model that has been trained to identify webpage types to the webpage. In other examples, in identifying the type associated with the webpage, the one or more processors are further responsive to the computer-executable instructions contained in the program code and operative to: analyze a uniform resource locator for the webpage. In yet other examples, in identifying the type associated with the webpage, the one or more processors are further responsive to the computer-executable instructions contained in the program code and operative to: provide a uniform resource locator for the webpage to a web search engine; and apply one or more machine learning models that have been trained to identify webpage types to one or more of: metadata associated with a search result; one or more images associated with a search result; and text associated with a search result. In still other examples, the identified type is a product shopping type, and the plurality of elements comprise at least one of: a price element, a type of product element, a product image element, a name of product element, a product description element, and a product rating element.

In additional aspects a computer-readable storage device comprising executable instructions that, when executed by one or more processors, assists with collecting and surfacing web content, is provided, the computer-readable storage device including instructions executable by one or more processors for: displaying, in a web browser, web content from a webpage; identifying a type associated with the webpage; receiving an indication to add a new section corresponding to the webpage to a content collection pane integrated in the web browser; identifying a plurality of elements on the webpage based on the identified type associated with the webpage; extracting a subset of web content from the webpage corresponding to the plurality of elements; and adding the new section to the content collection pane, wherein the new section comprises the subset of web content extracted from the webpage. In examples, in identifying the type associated with the webpage, the instructions are further executable by the one or more processors for: analyzing HTML for the webpage; and determining a type of the webpage based on a schema included in the HTML. In additional examples, in identifying the type associated with the webpage the instructions are further executable by the one or more processors for: applying a machine learning model that has been trained to identify webpage types to the webpage. In some examples, the machine learning model has been trained to identify webpages based on analyzing webpage layout format. In other examples, the machine learning model has been trained to identify webpages based on classifying one or more images in embedded in a webpage.

FIG. 1 is a schematic diagram illustrating an example distributed computing environment 100 for collecting and surfacing web content from a website via a collection pane of a web browser. Distributed computing environment 100 includes collection creation sub-environment 104, network and processing sub-environment 106, and generated collection sub-environment 106. Computing device 102A in collection creation sub-environment 102A and computing device 102B in generated collection sub-environment 106 may be the same or different computing devices. Network and processing sub-environment 106 includes network 105 and server computing device 103. Any of the computing devices described herein may communicate with one another via a wired or wireless network such as network 105. Server computing device 103 is illustrative of a computing device that can be utilized in cloud computing. In some examples one or more of the applications and/or operations executed by applications illustrated in these examples may be performed by a cloud-based application service operating on one or more computing devices, such as server computing device 103. Server computing device 103 is also illustrative of computing devices that may host websites that are accessed by remote computing devices (e.g., computing device 102A, computing device 102B) via a network such as network 105.

Computing device 102A displays a web browser that is currently active. A user has navigated to www.[onlinestore] .com and further navigated to a specific page of that website where a set of headphones can be purchased from the online store. The online store website may be a website that carries a variety of products that users can purchase and have delivered to them. The specific page of the online store website includes item A image element 110 (an image of the headphones), item name element 112, item details element 114 and reviews element 116. The user browsing the store website may want to research headphones and/or perform price comparisons on a plurality of websites prior to making a purchase. As such, the user may wish to create a collection of web content related to the potential headphone purchase that is generated from sets of web content extracted from webpages that the user browses while performing the product research.

In this example, the user may select (e.g., mouse click, finger input, etc.) new collection element 107 in the web browser, which may cause a new collection pane to be opened in the web browser while simultaneously displaying the collection pane and the current webpage. In this example, the selection of collection element 107 causes collections pop-up window 108 to be surfaced on the web browser. Collections pop-up window 108 includes elements that are selectable for creating a new collection of web content (e.g., a selectable "create a collection" element and a selectable "Add" element) displayable by the collection pane in the web browser. Although collection element 107 and collections pop-up window 108 are illustrated as providing mechanisms for initiating the opening of a collection pane and creating a new collection of web content, other user interface and/or input mechanisms for accomplishing the same are contemplated (e.g., drop-down menus, pop-out windows, voice commands, etc.).

In this example, the user has selected the "add" element in pop-up window 108, which has caused a subset of content from the currently active webpage to be added to a new collection (i.e., "Headphones Research") and that subset to be displayed in the collection pane 118 of the web browser. The currently active website is illustrated as being slightly compressed to the left side of the web browser user interface, while the collection pane 118 is displayed in the remainder of the space on the right side of the web browser user interface. Other display variances are contemplated. For example, the collection pane 118 may be displayed on the left side of the web browser user interface and the active webpage may be compressed to the right side; the collection pane 118 may be displayed at the top of the web browser user interface and the active webpage may be compressed to the bottom; and/or the collection pane 118 may be displayed at the bottom of the web browser user interface and the active webpage may be compressed to the top.

In this example, the user has utilized a single input mechanism to cause the subset of content from the active webpage to be added to the new collection. When a single input to add content from an active webpage to a collection is received, the browser application and/or a browser application service (e.g., a cloud-based application service associated with the web browser) may automatically identify and extract a subset of the web content from the webpage and add it to the collection. The collection may be stored locally on the computing device that is displaying the browser and/or remotely as part of a cloud-based application service associated with the browser.

According to examples, the subset of web content that is automatically identified and extracted may comprise a same type of content regardless of a type of webpage that the web content is being identified and extracted from. In other examples, the subset of web content that is automatically identified and extracted may comprise different types of content based on a type of webpage that the web content is being identified and extracted from. In such examples, the web browser and/or a service associated with the web browser identifies a type of content represented by the webpage. For example, the web browser and/or service associated with the web browser may analyze the Hyper Text Markup Language (HTML) for a webpage and determine whether it includes a schema that designates the webpage as a type of content. For example, a determination may be made as to whether the webpage includes a content type designation from an organization such as schema.org (e.g., creative works type, event type; embedded non-text objects type; health and medical types; organization types; person types; place, local business, restaurant types; product, offer aggregate offer types; review, aggregate rating types; action types; etc.). In some examples, if a type associated with the webpage cannot be determined based on identification of a designated schema type in the HTML, the web browser and/or a service associated with the web browser may apply a machine learning model that has been trained to identify webpage types to the webpage. In still other examples, an identification of the webpage type may comprise analyzing the uniform resource locator (URL) for the webpage. In still additional examples, the URL for the webpage may be provided to a web search engine and the web search engine may return information associated with the website (e.g., metadata, images, site category, etc.) that can be utilized to determine a type of the website.

Rules associated with the web browser and/or web browser service may dictate what subset of web content to identify and extract based on a type of webpage that has been identified. For example, if a webpage is determined to be a product type webpage, the web browser and/or a service associated with the web browser may attempt to identify and extract one or more of: a title; a primary product image; secondary product images; price content; review and/or rating information (e.g., user rating out of five stars, user score out of 10); and/or a basic description. For a flight booking type webpage, the web browser and/or service associated with the web browser may attempt to identify and extract one or more of: a departure location; an arrival location; date information; time information; price information; an image icon corresponding to an airline; and/or an airline identity. For a hotel booking type webpage, the web browser and/or service associated with the web browser may attempt to identify and extract one or more of: a hotel location; date information; price information; a primary image; review and/or rating information; and/or room type information. These are only examples and it should be understood that more or less information may be designated for identification and extraction via rules associated with the web browser and/or web browser service. Further, these are only a subset of the webpage types and other identification and extraction rules corresponding to the various webpage types that may be identified via the systems, methods and device described herein are within the scope of this application.

According to examples, the web browser and/or web browser service may identify the elements described above (e.g., primary image, secondary images, rating information, product description, price, etc.) by analyzing the HTML for a webpage and determining whether schema corresponding to those elements are present in the markup language and/or in the URL. For example, for the product rating element, a determination may be made as to whether an "aggregateRating" schema and/or tag is present in the HTML and/or URL for a webpage; for the primary image element, a determination may be made as to whether an "ImageObject" schema and/or tag is present in the HTML and/or URL for a webpage, etc. In some examples, if one or more elements corresponding to an identification and extraction rule for a webpage type cannot be identified via the schema and/or tag analysis, a machine learning model trained to identify the corresponding elements may be applied to the webpage. In additional examples, a set of rules may be applied to identify these elements (e.g., a rule may designate the primary image element as the largest image on a webpage, a rule may designate the title element as the first text on a webpage).

In this specific example, the web browser and/or a service associated with the web browser has identified the currently active webpage as being of a "product" type. As such, a set of rules corresponding to that webpage type are applied for identifying and extracting a subset of web content. The elements corresponding to that subset are depicted in collection pane 120 displayed on computing device 102B. Specifically, the product/item name element, the aggregate review element, and the primary product image have each been identified, extracted and reformatted for display in the collection pane in the right side of the web browser. Other content, such as the price may also be identified and extracted for display in the collection pane. In this example, a title for the new collection has also been added to the collection. That tile is "Headphones Research". In some examples, a title may automatically be added to a collection based on one or more properties identified for a webpage. In other examples, a user may add a custom title to a collection.

According to examples, web content included in a collection pane may be interacted with in the collection pane. In some examples, a user may click on web content in a collection pane and be re-directed to the webpage containing the web content in the primary browsing window. In other examples, the web content in a collection pane may be dynamic in nature and be automatically modified when the corresponding web content is modified at its source (e.g., host webpage and/or database). For example, if the aggregate review stars for a product increase or decrease, the representation of the review stars in a collection pane may also be modified. In additional examples, if content on a webpage corresponding to an element in a collection is modified at the webpage, a prompt may be surfaced in association with the collection pane that its underlying content has been modified.

Figure 2:
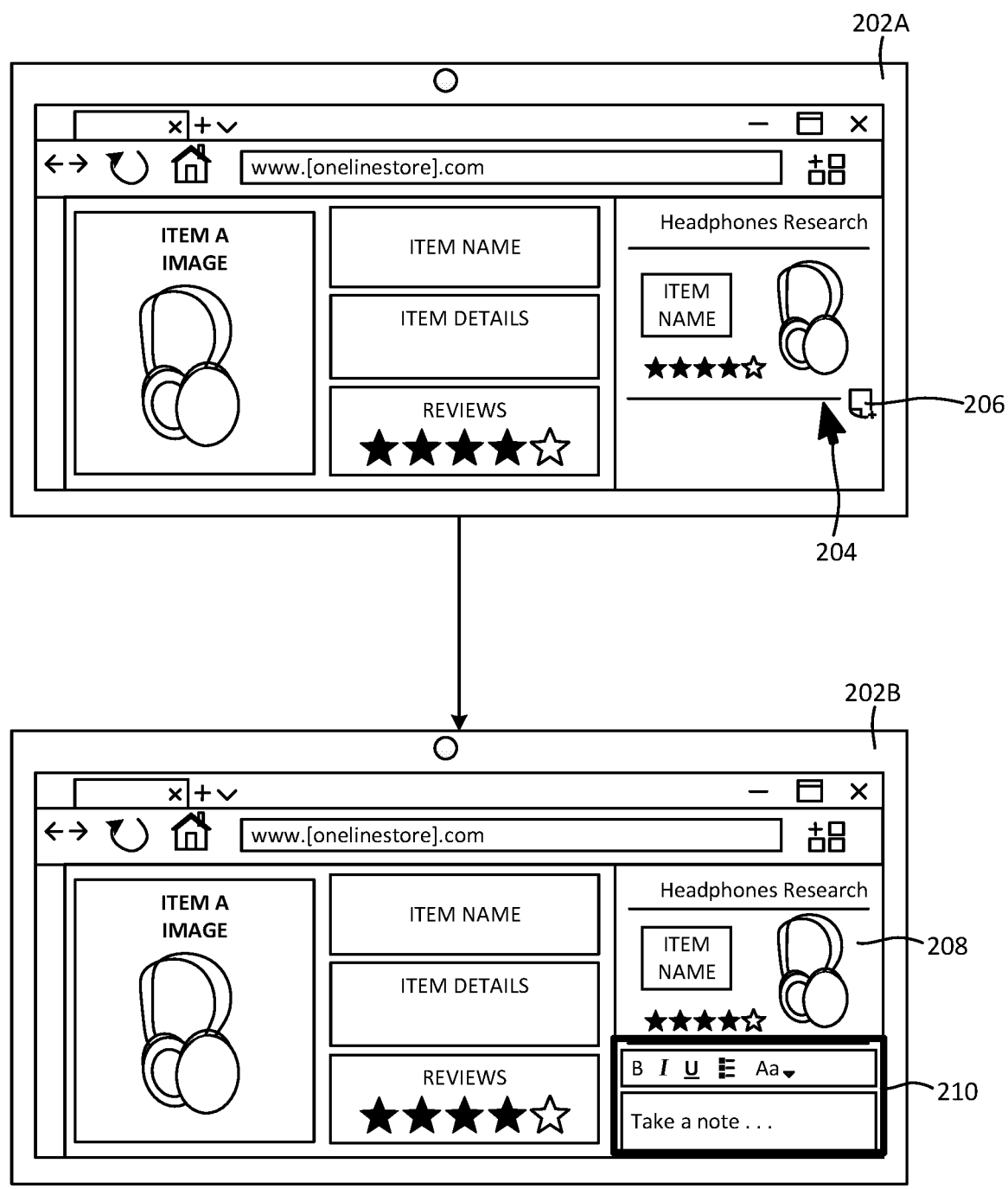
FIG. 2 illustrates the use of a note creation tool for adding notes to a set of collected web content via a collection pane of a web browser.

FIG. 2 illustrates the use of a note creation tool for adding custom notes to a set of collected web content via a collection pane of a web browser. In this example, a user has accessed the website www.[onlinestore].com on computing device 202A. Specifically, a specific product type webpage for a pair of headphones that can be purchased on the online store has been accessed and is displayed on computing device 202A. A subset of web content for the webpage has been identified, extracted, and transformed by the web browser and/or a service associated with the web browser. That subset is displayed in a new collection "Headphones Research" in a collection pane on the right side of the web browser.

According to examples, a user may add her own text in relation to a content set in a collection and have that text saved in association with the collection and content set. The user may initiate the text input by, for example, hovering a mouse cursor over an area of a content set in a collection and left clicking, providing a voice command, using a stylus or finger input in the vicinity of a content set in a collection, etc. In this specific example the user has moved the mouse cursor 204 to an area in displayable proximity to the content set in the collection corresponding to the currently active webpage, which causes text initiation element 206 to be displayed by the content set in the collection pane. When a left click input is then received at that position, text input box 210 is caused to be displayed below the content set in collection pane 208, as illustrated on the display of computing device 202B. The user may add her own custom text, which may then be saved in association with the content set and collection. In some examples, that text may be displayed below the content set in the collection pane. In other examples, that text may be surfaced in response to various inputs. For example, if a mouse cursor is hovered over the content set the custom text that has been added to a content set may be caused to be displayed in a pop-up window or fly-out pane over and/or from the associated content set.

Figure 3:
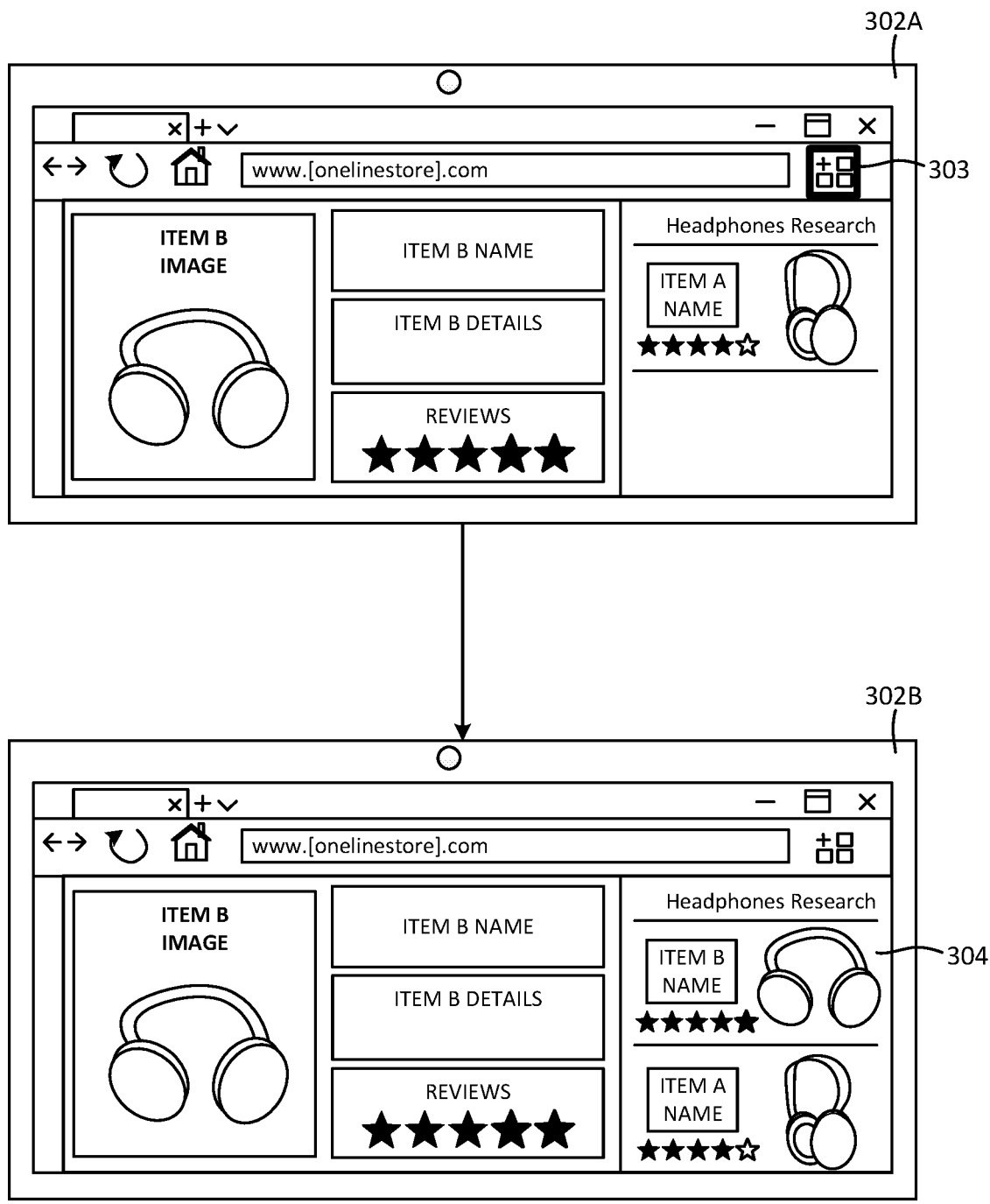
FIG. 3 illustrates the addition of a subset of content from a website to a collection of web content that has already been established.

FIG. 3 illustrates the addition of a subset of content from a website to a collection of web content that has already been established. In this example, a user has accessed the website www.[onlinestore].com on computing device 302A. The user had previously accessed a webpage related to a first item (ITEM A— headphones) and added a content set corresponding to a subset of content from that webpage to a collection in the web browser (i.e., "Headphones Research" collection in the collection pane displayed on the right portion of the web browser user interface of computing device 302A). In this example, the user has accessed another webpage of the online store. Specifically, a product type webpage for a different pair of headphones that can be purchased via the online store has been accessed and is displayed on computing device 302A. The user has initiated the adding of a subset of that web content to the collection that is open in the collection pane (i.e., the "Headphones Research" collection). The user may initiate the addition of the new subset to the collection via various mechanisms (e.g., a right click on the webpage and subsequent selection of an "add to collection" element, selection of new collection element 303, etc.).

Once the addition of the new web content subset to the existing collection has been initiated, the web browser and/or a service associated with the web browser identifies a type of webpage associated with the webpage (e.g., via schema identification, via machine learning), applies a set of rules corresponding to that webpage type for identifying specific content, extracts that specific content corresponding to the applied rules, and transforms that content for display in a new content set in the existing collection in the collection pane. In this specific example, the web browser and/or service associated with the web browser has identified the currently active webpage as being of a "product" type. As such, a set of rules corresponding to that webpage type are applied for identifying and extracting a subset of web content. The elements corresponding to that subset are depicted in collection pane 304 on computing device 302B. Specifically, the product/item name element ("ITEM B NAME"), the aggregate review element (five stars out of five stars), and the primary product image have each been identified, extracted and reformatted/transformed for display in the collection pane 304 on the right side of the web browser.

The content sets of a collection may be organized for display in a collection pane based on a time that each of those content sets were added to a collection. For example, because the content set related to item B was added to the "Headphones Research" collection after the content set related to item A, the content set related to item B is organizationally displayed above the content set related to item A in the collection pane. A user may thus scroll through the collection pane to view and interact with various content sets in a collection pane. In other examples, the organization of content sets of a collection may be customizable. For example, a user may manually modify the organization of content sets in a collection pane by dragging and dropping the content sets in the collection pane. In other examples, a collection pane tool may be utilized for sorting and organizing a collection pane according to one or more features (e.g., price, name, location, etc.).

Figure 4:
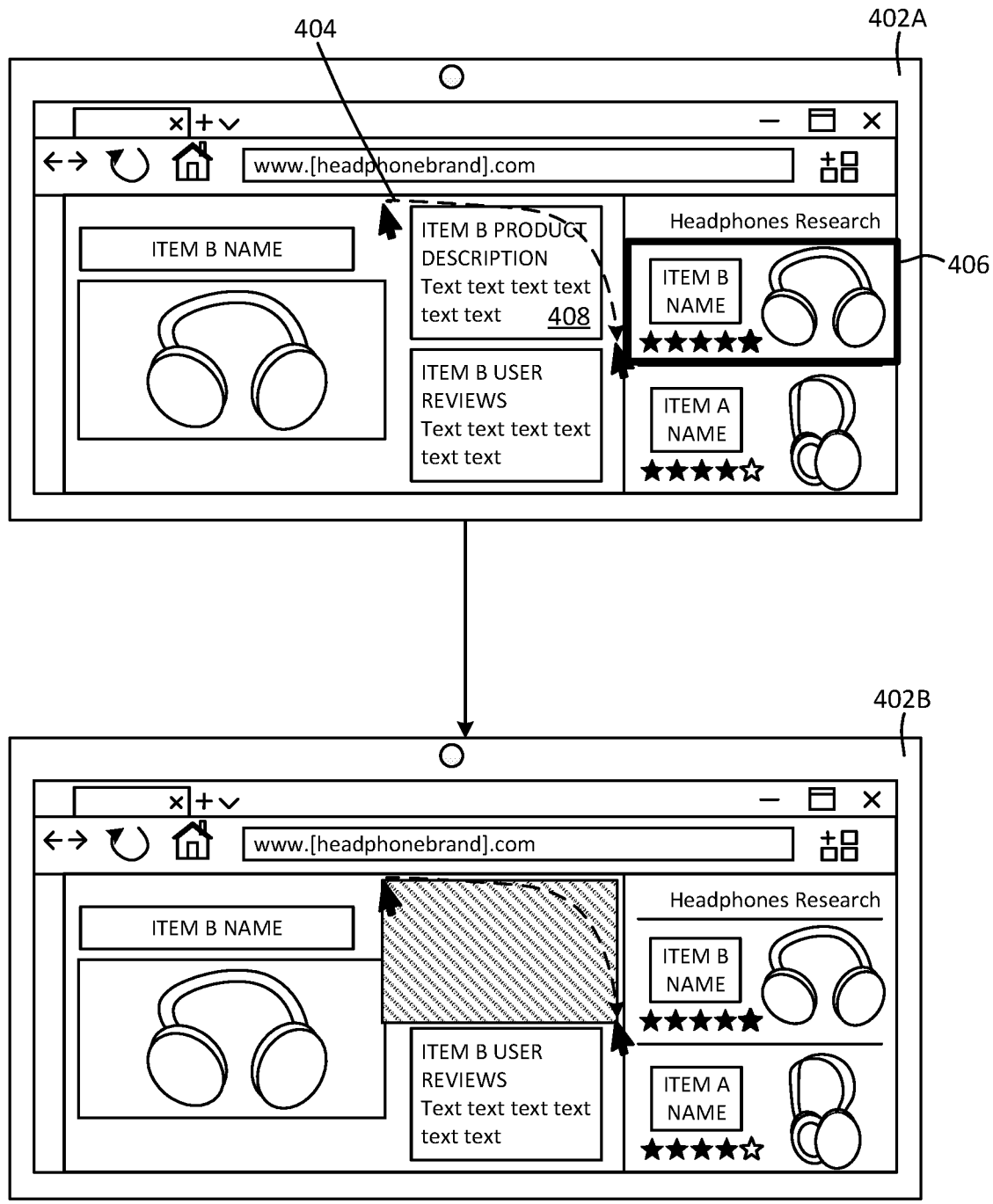
FIG. 4 illustrates a selection input for adding a specific subset of web content from a webpage to a collection of web content in a collection pane of a web browser.
Figure 5:
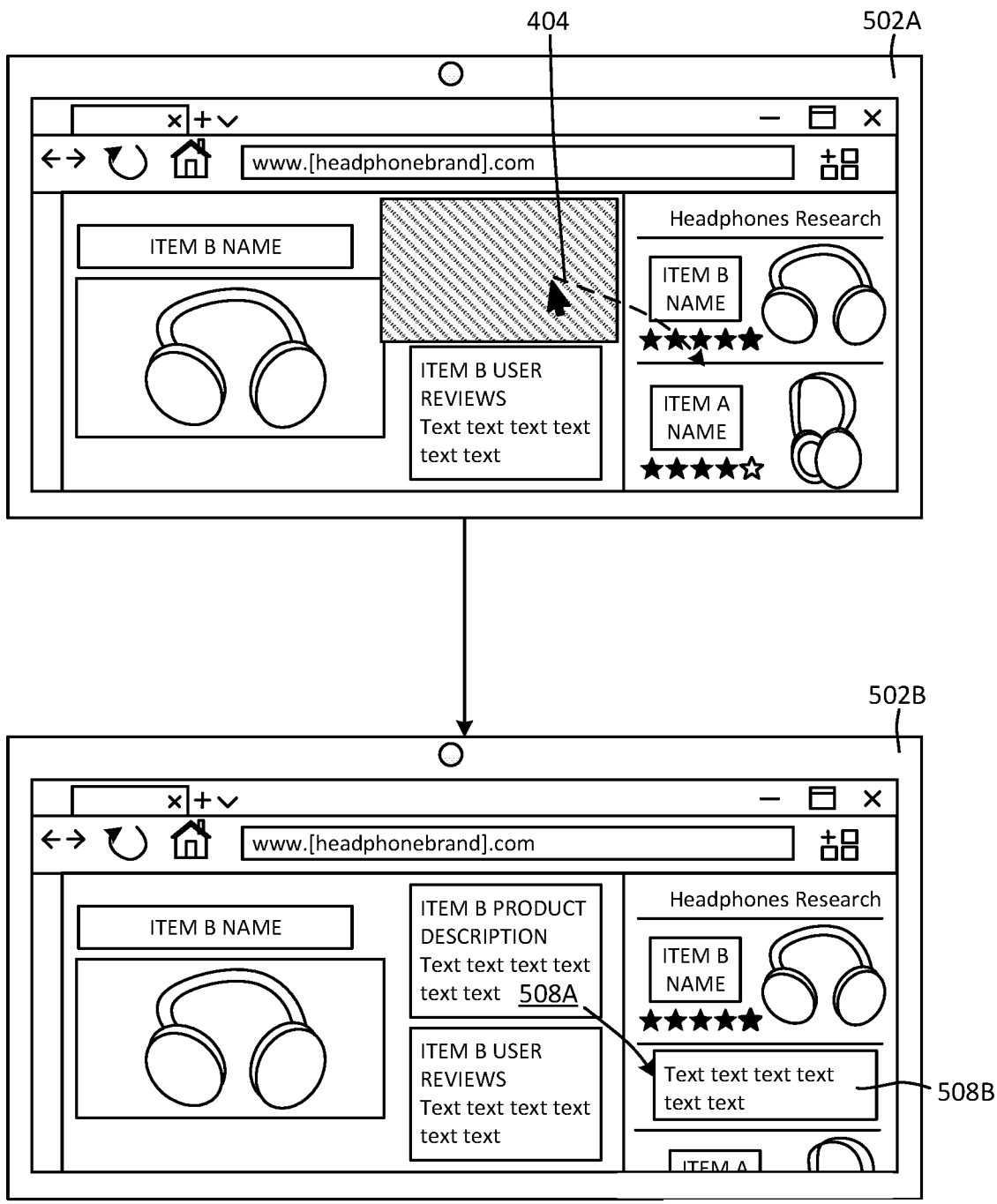
FIG. 5 illustrates the addition of selected web content from a webpage to a set of previously collected web content in a collection pane of a web browser.

FIG. 4 illustrates a selection input for adding a specific subset of web content from a webpage to a collection of web content in a collection pane of a web browser, and FIG. 5 illustrates the addition of the selected web content from the webpage to a set of previously collected web content in the collection pane of a web browser. With reference to FIG. 4, a user has accessed the website www.[onlinestore].com on computing device 402A. The user had previously accessed a webpage related to a first item (ITEM A— headphones) and added content set corresponding to a subset of content from that webpage to a collection in the web browser (i.e., "Headphones Research" collection in the collection pane displayed on the right side of the web browser user interface of computing device 402A). The user has accessed another product type webpage of the online store for a different pair of headphones and a subset of web content has also been added to the "Headphones Research" collection. However, the rules that automatically populate a collection (and therefore a collection pane) with content from a webpage based on rules associated with a webpage's content type may not always capture every piece of web content from a webpage that a user would like to include in the collection.

The systems, methods and devices described herein provide mechanisms for custom selection of webpage content and addition of that content to either create new content sets in collections and/or to supplement content sets that have already been added to a collection. In this example, a drag selection mechanism is utilized to select content from the webpage displayed on computing device 402A for adding that selected content to content set 304 that was previously added to the "Headphones Research". Specifically, a click and drag mechanism 404 is utilized to highlight a product description element 408 of the product that corresponds to the currently active webpage. The click and drag mechanism 404 results in the product description element 408 being highlighted as illustrated on the display of computing device 402B.

As shown with reference to FIG. 5, and specifically computing device 502A, once product description element 408 has been selected/highlighted via click and drag mechanism 404, a drag and drop input 404 whereby the product description element 408 is dragged and dropped into a display area in the collection pane corresponding to Item B is then received. As illustrated with reference to computing device 502B, this action may result in product description element 408/508A being added to the content set corresponding to item B in the collection pane. That is, the product description element 408/508A is reformatted and displayed at text element 508B in the collection pane. In additional examples, the drag and drop action may result in product description element 408/508A being added as a separate content set in the collection pane.

Although a highlight and subsequent drag and drop mechanism for selecting and adding content from a webpage to a collection (and therefore a content set in a collection pane) is described herein, other mechanisms are contemplated. In one such example, only a drag a drop may need to be received (i.e., no first highlighting input need be received). In another example, a right click input on an element may be received and a selectable prompt to add the element to a content set and/or collection may be received. In another example, a verbal instruction to add specific content from a webpage to a content set and/or collection may be received. Additional input mechanisms are contemplated.

Figure 6:
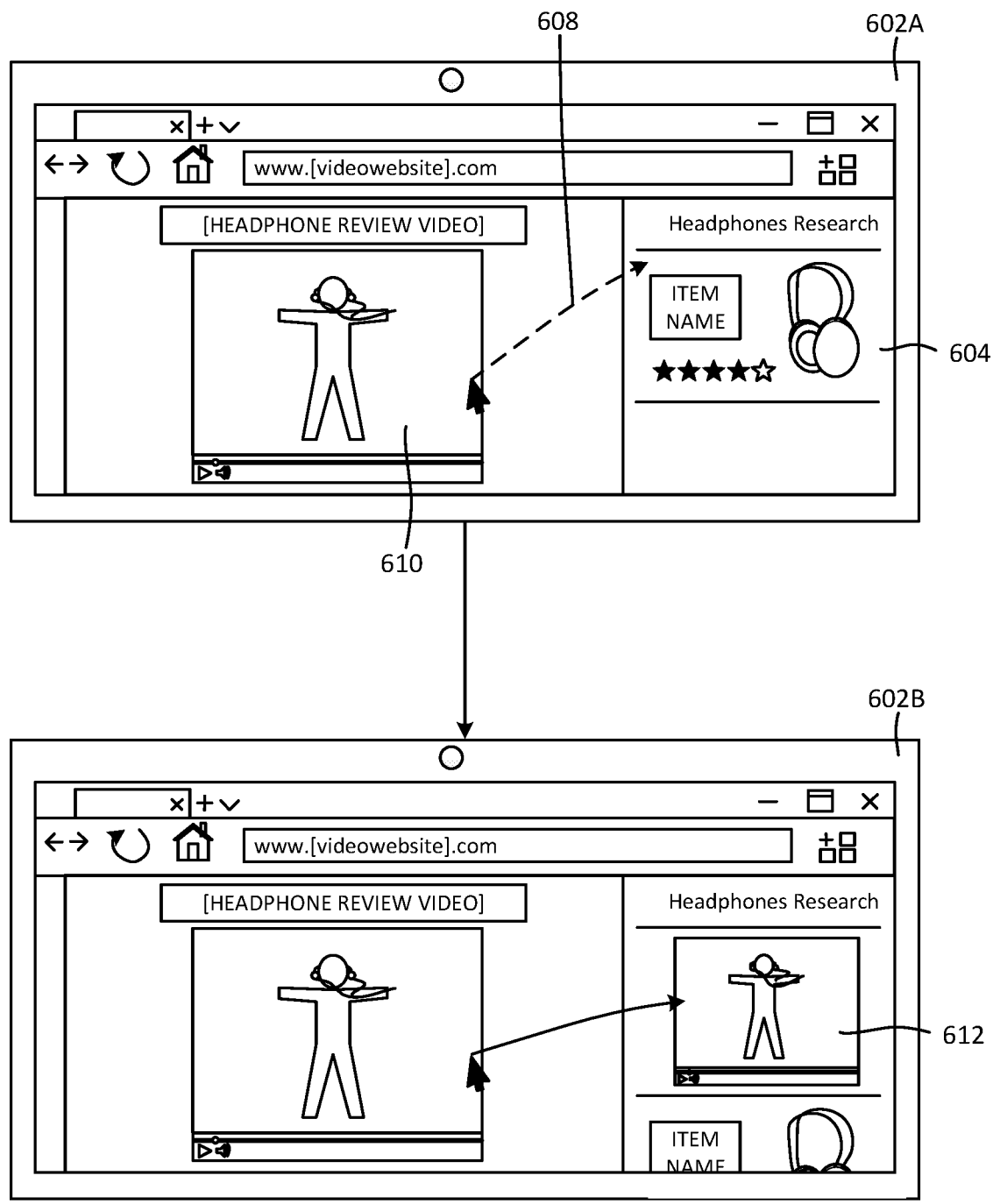
FIG. 6 illustrates the addition of video content from a website to a set of previously collected web content in a collection pane of a web browser.

FIG. 6 illustrates the addition of video content from a website to a set of previously collected web content in a collection pane of a web browser. A user has accessed the website www.[videowebsite].com on computing device 402A. Specifically, a video object type webpage is displayed that includes a video object 610 of a headphones product review. The user had previously created a "Headphones Research" collection, which includes content from a first product type website included in a content set displayed in collection pane 604. In this example, a click drag and drop mechanism 608 is utilized to add the video object 610 to the "Headphones Research" collection. Thus, when a user clicks with a mouse on video object 610, holds that click and drags the video object 610 into the collection pane 604, and then subsequently unclicks in the collection pane 604, the video is caused to be added to a new content set in collection pane 604. The reformatted video element 612 corresponding to video object 610 is shown displayed in the collection pane of computing device 602B.

In some examples, the reformatted video element 612 may be interacted with (e.g., receive a click on the video) and the open browser may be redirected back to the webpage containing the video object 610. In other examples, the video itself may be embedded in the collection pane such that the video can play directly in the collection pane without the main browser window navigating back to the webpage containing the video object 610.

Although a mouse click drag and drop mechanism 608 is provided by way of example, other mechanisms for adding a video object from a webpage to a collection (and therefore a content set in a collection pane) are within the scope of this application (e.g., right click and prompt selection, voice command, finger/stylus drag and drop, etc.).

Figure 7:
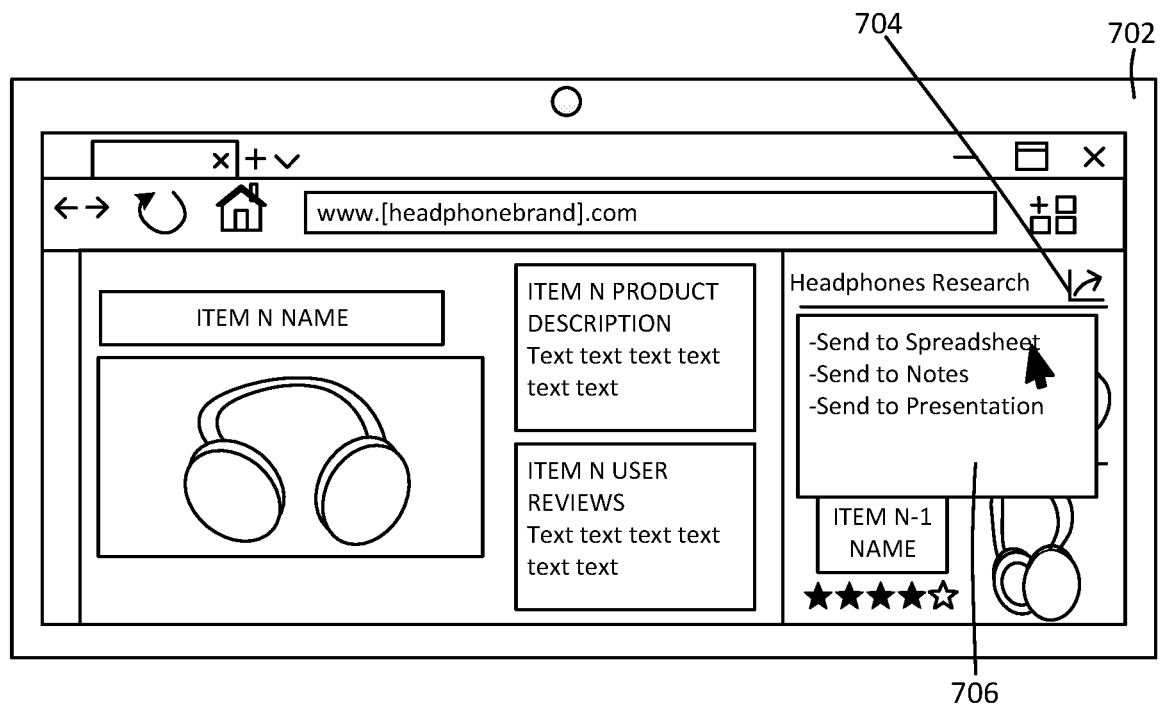
FIG. 7 illustrates the utilization of a transformation engine for exporting and transforming a collection of web content from multiple websites in a first format in a collection pane of a web browser, to a second format in a spreadsheet application.

FIG. 7 illustrates the utilization of a transformation engine for exporting and transforming a collection of web content from multiple websites in a first format in a collection pane of a web browser, to a second format in a spreadsheet application. In this example, computing device 702 displays a web browser, with the website www.[headphonebrand].com open in a left portion of the browser, and a "Headphone Research" collection pane open on the right side of the browser. In this example, the "Headphones Research" collection which is displayed in the collection pane of the web browser includes six content sets (although only two are partially visible in the illustrated example). Information corresponding to the collection may be exported and transformed for display in other applications. Thus, in this example, a selection is made of collection export user interface element 704. This selection initiates the display of pop-up window 706, which has selectable options for exporting and transforming the collection to one of: a spreadsheet application, a notes application, and a presentation application. In this example, a user selects the "Send to Spreadsheet" option which initiates the exporting and transforming of the "Headphones Research" collection for display in a spreadsheet application as more fully discussed in relation to FIG. 8.

FIG. 8 illustrates the result of the utilization of a transformation engine for exporting and transforming a collection of web content from multiple websites in a first format in a collection pane of a web browser, to a second format in a spreadsheet application. Specifically, a spreadsheet application instance is displayed on computing device 802. The spreadsheet application instance displays elements from the "Headphones Research" collection discussed in relation to FIG. 7. Although not all of the information for each content set in the collection is displayed in the spreadsheet application instance (e.g., product images may not be transferred to the spreadsheet application instance in some examples), much of it is. Specifically, the title of the collection "Headphone Research" is displayed at the top of the spreadsheet application instance; column headings for a plurality of value types have been populated and are displayed, and values for each of the content sets in the collection that have values for those value types have been populated under the corresponding column heading.

The column headings, which are illustrated in row two of the spreadsheet application instance, are: "Brand", "Name", "Color", "Price", "Rating" and "Notes". Row three includes values for a first content set (Bose ABC) in the collection for each of those value types for which a value exists for that specific content set. Thus, the first content set in the collection includes at least the following: Brand: Bose, Name: ABC, Color: Black, Price: $485, Rating: five out of five stars, Notes: [some custom text]. That content has been extracted for the first content set and added to each of the corresponding cells under each of the relevant column headings in the spreadsheet application instance.

Row four includes values for a second content set (Bose DEF) in the collection for each of those value types for which a value exists for that specific content set. Thus, the second content set in the collection includes at least the following: Brand: Bose, Name DEF, Color: Black, Price: $450, Rating: five out of five stars. That content has been extracted for the second content set and added to each of the corresponding cells under each of the relevant column headings in the spreadsheet application instance. Notably, no custom notes for the second content set were identified, and as such, there is no value for that cell under the "Notes" heading for the second content set.

Row five includes values for a third content set (Sony GHI) in the collection for each of those value types for which a value exists for that specific content set. Thus, the third content set in the collection includes at least the following: Brand: Sony, Name GHI, Color: Silver, Price: $275, Rating: four out of five stars. Notes: [some custom text]. That content has been extracted for the third content set and added to each of the corresponding cells under each of the relevant column headings in the spreadsheet application instance.

Row six includes values for a fourth content set (Shure JKL) in the collection for each of those value types for which a value exists for that specific content set. Thus, the fourth content set in the collection includes at least the following: Brand: Shure, Name: JKL, Color: Black, Price: $375, Rating: three out of five stars, Notes: [some custom text]. That content has been extracted for the fourth content set and added to each of the corresponding cells under each of the relevant column headings in the spreadsheet application instance.

Row seven includes values for a fifth content set (Grado MNO) in the collection for each of those value types for which a value exists for that specific content set. Thus, the fifth content set in the collection includes at least the following: Brand: Grado, Name: MNO, Color: Pink, Price: $500, Rating: two out of five stars. That content has been extracted for the fifth content set and added to each of the corresponding cells under each of the relevant column headings in the spreadsheet application instance. Notably, no custom notes for the fifth content set were identified, and as such, there is no value for that cell under the "Notes" heading for the fifth content set.

Row eight includes values for a sixth content set (Grado PQR) in the collection for each of those value types for which a value exists for that specific content set. Thus, the sixth content set in the collection includes at least the following: Brand: Grado, Name: PQR, Color: Red, Price: $295, Rating: one out of five stars. That content has been extracted for the sixth content set and added to each of the corresponding cells under each of the relevant column headings in the spreadsheet application instance. Notably, no custom notes for the sixth content set were identified, and as such, there is not value for that cell under the "Notes" heading for the sixth content set.

Exporting a collection to a spreadsheet application allows a user to easily visualize and compare content identified and collected on the web via the systems, methods and devices described herein. Additionally, exporting a collection to a spreadsheet application provides users with access to spreadsheet tools such as sorting and filtering (e.g., sort by brand, sort by price, filter by brand, etc.), as well as spreadsheet application functions, which provide users with an added degree of functionality in making their decisions and viewing their collected data. In some examples, a link to a spreadsheet generated from a collection may be included in a corresponding collection pane to make accessing the spreadsheet from the web browser efficient and user friendly.

Although the column headings corresponding to content set values are provided by way of example in relation to product type webpages and a corresponding product type collection, it should be understood that different product headings for a product type collection are contemplated, as are different headings for different collection types (e.g., location collection type, travel collection type, restaurant collection type, organization collection type, etc.). According to some examples, a set of rules associated with each collection type may dictate which headings are populated in a corresponding collection spreadsheet. For example, the headings (and corresponding values that are populated from content sets in a collection) for a location type collection may be set by a rule that specifies the following heading types: country, state, municipal body, longitude, latitude, location name, location type, etc. Similarly, the headings (and corresponding values that are populated from content sets in that collection) for a restaurant type collection may be set by a rule that specifies the following heading types: restaurant name, food type, location, hours of operation, phone number, etc. In some examples users may customize these rules so that custom headings may be created and prepopulated for one or more collection types. Additionally, in examples where more than one webpage type is represented in a collection (e.g., product webpage type, company webpage type) a user may be prompted to select which headings and corresponding values from the collection will be exported to a spreadsheet.

Figure 9:
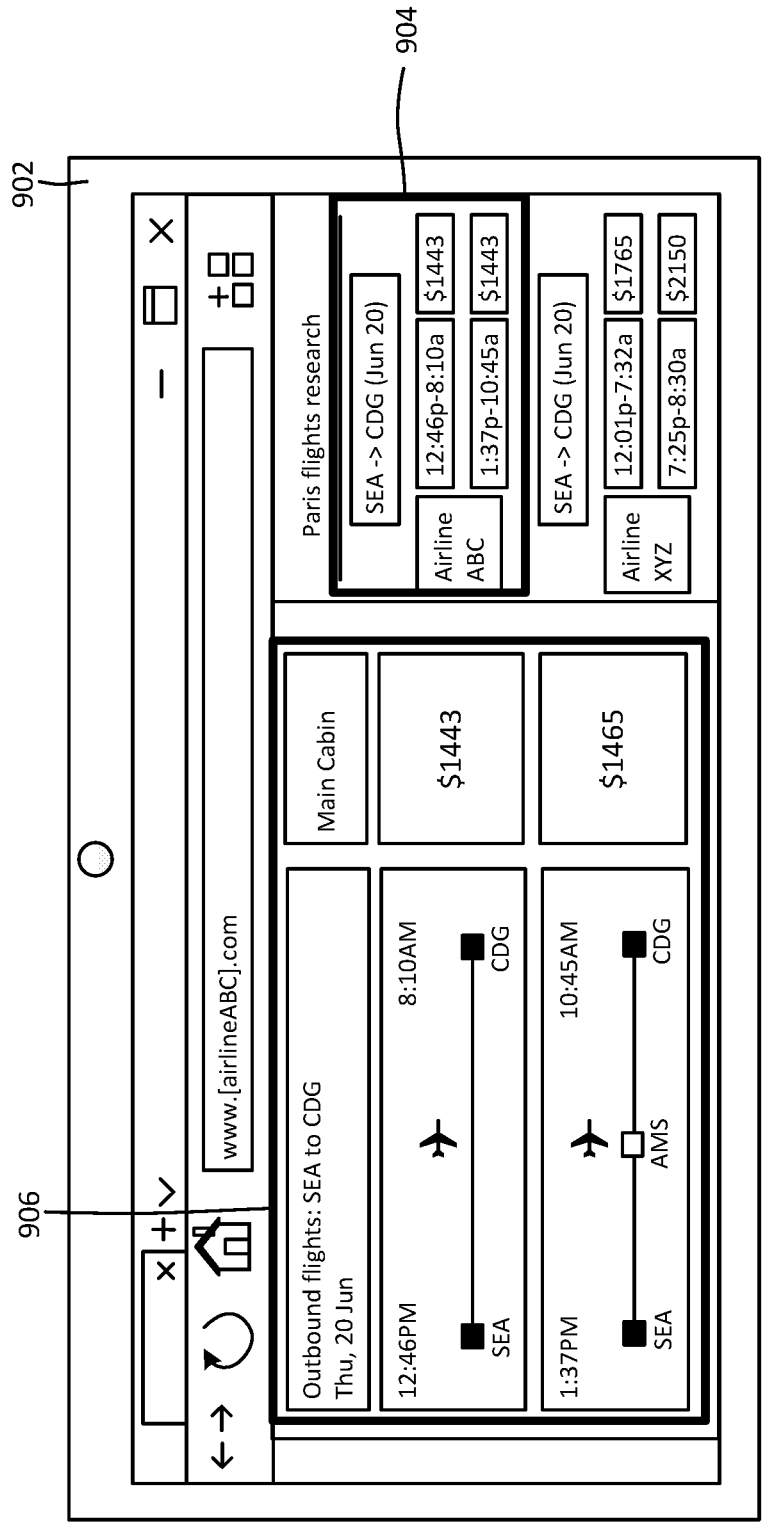
FIG. 9 depicts a computing device displaying a collection of dynamic flight content from multiple airline websites in a collection pane of a web browser.

FIG. 9 depicts a computing device displaying a collection of dynamic flight content from multiple airline websites in a collection pane of a web browser. In this example, a user has accessed the website www.[airlineABC].com on computing device 902. The user had previously accessed a webpage on a second airline's website (airline XYZ) and added a subset of information from that webpage associated with a flight from Seattle to Paris to a collection titled "Paris flights research". In this example, the currently active webpage for airline ABC is displayed, and specifically, flight information for the same flight for which a content set for airline XYZ was previously added to the "Paris flight research" collection. The displayed flight elements 906 for airline ABC include: flight type: "outbound", departure airport: "SEA", arrival location: "CDG", class type: "Main Cabin", and flight details for two different flights from airline ABC (i.e., departure times, arrival times, a layover airport for one of the flights, and prices).

A user has initiated the adding of a subset of the web content from the airline ABC webpage to the collection that is open in the collection pane (i.e., "Paris flights research" collection). The user may initiate the addition of the new content set to the collection via various mechanisms (e.g., a right click on the webpage and subsequent selection of an "add to collection" element, selection of the new collection element in the upper right corner of the web browser, etc.). In this example, the web browser and/or a service associated with the web browser has identified the currently active webpage as being of a "flight" type. As such, a set of rules corresponding to that webpage type are applied for identifying and extracting a subset of web content from the webpage. The elements corresponding to that subset are depicted in content set 904 in the collection pane integrated in the right side of the web browser. Specifically, the airline name, the departure airport, the arrival airport, the flight date, the departure times, the arrival times, and the prices for the two different flights have each been identified, extracted and reformatted for display in the collection pane in the right side of the web browser.

According to examples, if the flight price for one of the flights included in the collection is modified, the collection may dynamically modify that price in its representation in the collection. In additional examples, the collection tool may provide a notification (e.g., popup window, email, notification badging on the corresponding content item in the collection, etc.) when a flight price included in a collection is modified at the host website and/or database. In some examples, in order to keep the prices in the collection up to date, the collection tool may automatically re-perform the flight search on the corresponding airline(s) websites on a periodic basis (e.g., daily, weekly). In still other examples, the airline website and/or database may push flight price updates to the web browser application and/or service. In yet other examples, the airline website and/or database may keep a list of updated price updates available for retrieval by the web browser.

FIG. 10 illustrates the result of the utilization of a transformation engine for exporting and transforming a collection of dynamic flight content from multiple airline websites in a first format in a collection pane of a web browser, to a second format in a spreadsheet application. Specifically, a spreadsheet application instance is displayed on computing device 1002. The spreadsheet application instance displays elements from the "Paris flights research" collection discussed in relation to FIG. 9. For illustrative purposes, it is also assumed that the "Paris flights research" collection discussed in relation to FIG. 9 not only includes information related to the two airlines and four flights illustrated on computing device 902, but that there is also a third content set for the Paris flight included in the collection from airline RRR. The information displayed on the spreadsheet application instance user interface on computing device 1002 includes: the title of the collection "Paris flights research", which is displayed at the top of the spreadsheet application instance; column headings for a plurality of value types; and values for each of the content sets in the collection that have values for those value types.

The column headings, which are displayed in row two of the spreadsheet application instance, are: "Airline", "Layover", "Airport", "Time" and "Price". Rows three and four include values for a first content set related to two flights from Seattle to Paris on Airline ABC. Rows four and five include values for a second content set related to two flights from Seattle to Paris on airline XYZ. Rows six and seven include values for a third content set related to two flights from Seattle to Paris on airline RRR.

Row three includes values for a first flight of a first content set for airline ABC in the collection for each of those value types for which a value exists for that specific content set and flight. Thus, the first content set in the collection includes at least the following information for the first flight from airline ABC: Airline: ABC, Layover: N; Layover Airport: N/A, Time (i.e., duration of flight): 10 h32 min, Price: $1443. That content has been extracted for the first content set and added to each of the corresponding cells under each of the relevant column headings in the spreadsheet application instance.

Row four includes values for a second flight of the first content set for airline ABC in the collection for each of those value types for which a value exists for that specific content set and flight. Thus, the first content set in the collection includes at least the following information for the second flight from airline ABC: Airline: ABC, Layover, Y, Layover Airport: AMS, Time: 12 h5 m, Price: $1465. That content has been extracted for the first content set and added to each of the corresponding cells under each of the relevant column headings in the spreadsheet application instance.

Row five includes values for a first flight of a second content set (for airline XYZ) in the collection for each of those value types for which a value exists for that specific content set and flight. Thus, the second content set in the collection includes at least the following information for the first flight from airline XYZ: Airline: XYZ, Layover: N, Layover Airport: N/A, Time: 10 h47 m, Price: $1765. That content has been extracted for the second content set and added to each of the corresponding cells under each of the relevant column headings in the spreadsheet application instance.

Row six includes values for a second flight of the second content set (for airline XYZ) in the collection for each of those value types for which a value exists for that specific content set and flight. Thus, the second set in the collection includes at least the following information for the second flight from airline XYZ: Airline: XYZ, Layover: Y, Layover Airport: ORY, Time: 13 h17 m, Price: $2150. That content has been extracted for the second content set and added to each of the corresponding cells under each of the relevant column headings in the spreadsheet application instance.

Row seven includes values for a first flight of a third content set (for airline RRR) in the collection for each of those value types for which a value exists for that specific content set and flight. Thus, the third content set in the collection includes at least the following information for the first flight from airline RRR: Airline: RRR, Layover: Y, Layover Airport: LHR, Time: 16 h28 m, Price: $2436. That content has been extracted for the third content set and added to each of the corresponding cells under each of the relevant column headings in the spreadsheet application instance.

Row eight includes values for a second flight of a third content set (for airline RRR) in the collection for each of those value types for which a value exists for that specific content set and flight. Thus, the third content set in the collection includes at least the following information for the second flight from airline RRR: Airline RRR, Layover: Y, Layover Airport: LHR, Time: 15 h42 m, Price: $1217. That content has been extracted for the third content set and added to each of the corresponding cells under each of the relevant column headings in the spreadsheet application instance.

Although the column headings corresponding to content set values are provided by way of example in relation to flight type webpages and a corresponding flight type collection, it should be understood that different flight headings for a flight type collection are contemplated, as are different headings for different collection types (e.g., location collection type, hotel collection type, restaurant collection type, etc.). According to some examples, a set of rules associated with each collection type may dictate which headings are populated in a corresponding collection spreadsheet. In some examples, users may customize these rules so that custom headings may be created and prepopulated for one or more collection types. Additionally, in examples where more than one webpage type is represented in a collection (e.g., location webpage type, flight webpage type) a user may be prompted to select which headings and corresponding values from the collection will be exported to a spreadsheet.

Figure 11:
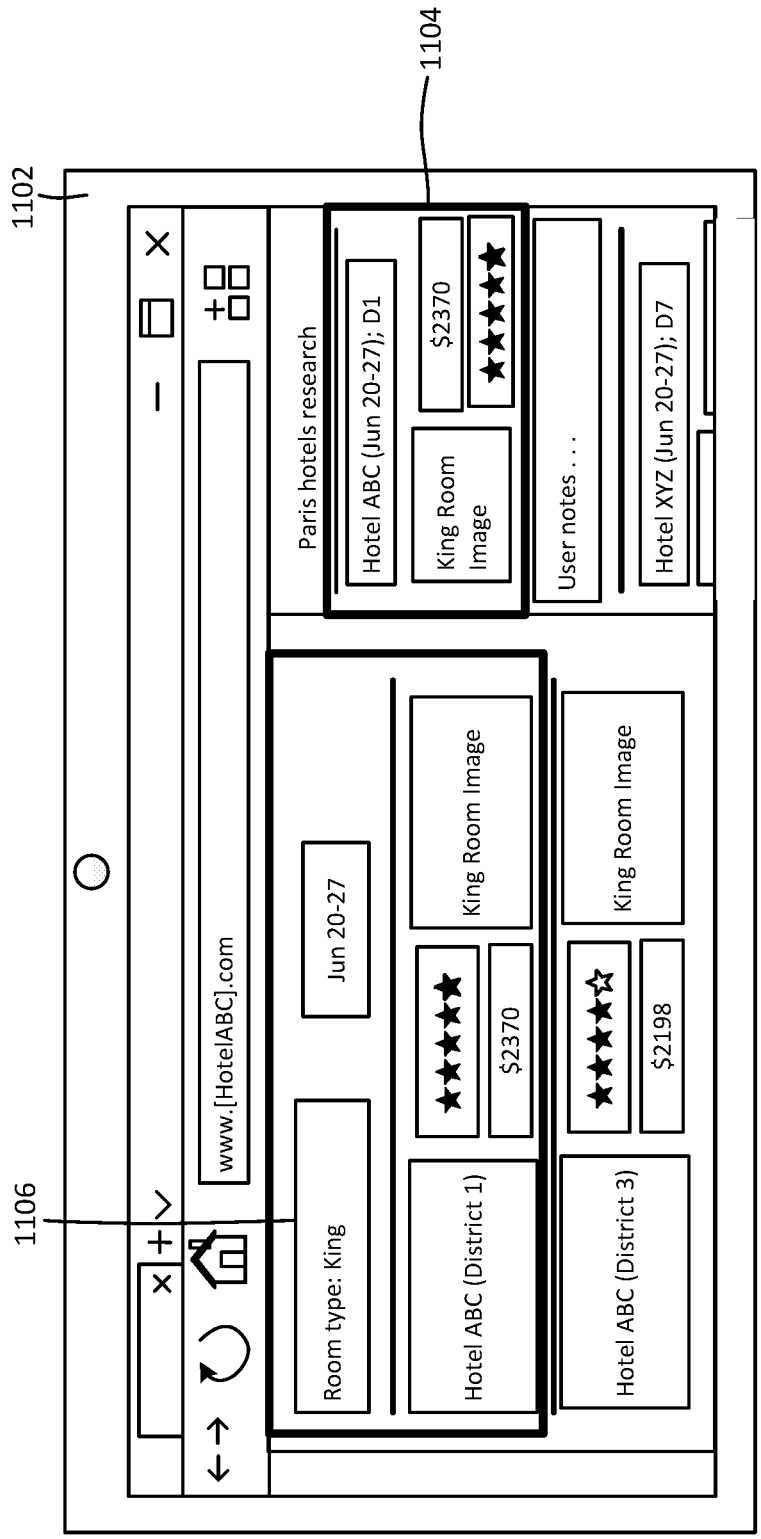
FIG. 11 depicts a computing device displaying a collection of dynamic hotel content from multiple websites in a collection pane of a web browser.

FIG. 11 depicts a computing device displaying a collection of dynamic hotel content from multiple websites in a collection pane of a web browser. In this example, a user has accessed the website www.[HotelABC].com on computing device 1102. The user (or a user with access to the associated collection) had previously accessed a webpage on a second hotel's website (Hotel XYZ) and added a subset of web content from that webpage associated with a hotel stay in Paris from June 20 to June 27 to a collection titled "Paris hotels research". In this example, the currently active webpage for hotel ABC is displayed for two Hotel ABC locations in Paris, and specifically hotel information from those locations for the same dates (June 20 to June 27) that the content set in the "Paris hotels research" collection relate to. However, the user has selectively added content from only one of those locations to the "Paris hotels research" collection (i.e., content set 1104). The displayed hotel elements 1106 corresponding to content set 1104 for Hotel ABC include: room type: "King", stay dates: "June 20-27", hotel name "Hotel ABC", hotel location: "District 1", aggregate rating: five out of five stars, price: "$2198", a primary room image.

According to examples, if the hotel price for the hotel added to the collection is modified, the collection may dynamically modify that price in its representation in the collection. In additional examples, a collection tool may provide a notification (e.g., popup window, email, push notification, etc.) when a hotel price included in a collection is modified at the host website. In some examples, to keep the prices in the collection up to date, a collection tool may automatically re-perform the hotel search on the corresponding hotel websites on a periodic basis (e.g., daily, weekly). In still other examples, the hotel website and/or a hotel database associated with the hotel may push hotel price updates to the web browser application and/or service. In yet other examples, the hotel website and/or hotel database associated with the hotel may keep a list of updated price updates available for retrieval by the web browser.

FIG. 12 illustrates the result of the utilization of a transformation engine for exporting and transforming a collection of dynamic hotel content from multiple hotel websites in a first format in a collection pane of a web browser, to a second format in a spreadsheet application. Specifically, a spreadsheet application instance is displayed on computing device 1202. The spreadsheet application instance displays elements from the "Paris hotels research" collection discussed in relation to FIG. 11. For illustrative purposes, it is assumed that the "Paris hotels research" collection discussed in relation to FIG. 11 not only includes information related to the two hotels (Hotel ABC and Hotel XYZ) illustrated in the "Paris hotels research" collection pane on computing device 1102, but that there is also a third content set in the collection for Hotel QRS and a fourth content set in the collection for Hotel LMN. The information displayed on the spreadsheet application instance user interface on computing device 1202 includes: the title of the collection "Paris hotels research", which is displayed at the top of the spreadsheet application instance; column headings for a plurality of value types; and values for each of the content sets in the collection that have values for those value types.

The column headings, which are displayed in row two of the spreadsheet application instance, are: "Hotel", "Location", "Size", "Rating" and "Price". Row three includes values for a first content set in the collection related to Hotel ABC for a stay from June 20 to June 27. Row four includes values for a second content set in the collection related to Hotel XYZ for a stay from June 20 to June 27. Row five includes values for a third content set in the collection related to Hotel QRS for a stay from June 20 to June 27. Row six includes values for a fourth content set in the collection related to Hotel LMN for a stay from June 20 to June 27.

Row three includes values for a first content set in the collection corresponding to a webpage for Hotel ABC. Thus, the first content set in the collection includes at least the following information for Hotel ABC: Hotel: ABC, Location: D1 (district 1); Size: King, Rating: five out of five stars, Price: $2370. That content has been extracted for the first content set and added to each of the corresponding cells under each of the relevant column headings in the spreadsheet application instance.

Row four includes values for a second content set in the collection corresponding to a webpage for Hotel XYZ. Thus, the second content set in the collection includes at least the following information for Hotel XYZ: Hotel: XYZ, Location: D7 (district 7), Size: King, Rating: three out of five stars, Price: $2200. That content has been extracted for the second content set and added to each of the corresponding cells under each of the relevant column headings in the spreadsheet application instance.

Row five includes values for a third content set in the collection corresponding to a webpage for Hotel QRS. Thus, the third content set in the collection includes at least the following information for hotel QRS: Hotel: QRS, Location: D1 (district 1), Size: King, Rating: four out of five stars, Price: $2125. That content has been extracted for the third content set and added to each of the corresponding cells under each of the relevant column headings in the spreadsheet application instance.

Row six includes values for a fourth content set in the collection corresponding to a webpage for Hotel LMN. Thus, the fourth content set in the collection includes at least the following information for hotel LMN: Hotel: LMN, Location D2 (district 2), Size: King, Rating: three out of five stars, Price: $1895. That content has been extracted for the fourth content set and added to each of the corresponding cells under each of the relevant column headings in the spreadsheet application instance.

Although the column headings corresponding to content set values are provided by way of example in relation to hotel type webpages and a corresponding hotel type collection, it should be understood that different hotel headings for a hotel type collection are contemplated, as are different headings for different collection types. According to some examples, a set of rules associated with each collection type may dictate which headings are populated in a corresponding collection spreadsheet. In some examples, these rules may be customizable that that custom headings may be created and prepopulated for one or more collection types. Additionally, in examples where more than one webpage type is represented in a collection, a selectable option may be presented for selecting which headings and corresponding values from the collection will be exported to a spreadsheet.

According to some examples, if a determination is made that information regarding a hotel included in a collection has been modified at the source (e.g., e.g., at the hotel website, at a database associated with the hotel), the web browser application and/or a service associated with the web browser application may automatically update the spreadsheet corresponding to the collection. In other examples, the web browser application and/or service associated with the web browser application may send a message to the user and/or surface a notification on one of the user's devices indicating that information concerning the hotel has been modified. For example, if a price for a hotel stay has increased or decreased, or there has been an availability change for a hotel in a collection, the web browser application and/or a service associated with the web browser application may send an email to an email account associated with a user that has access to the corresponding collection, and/or surface a notification on a device associated with that user.

Figure 13:
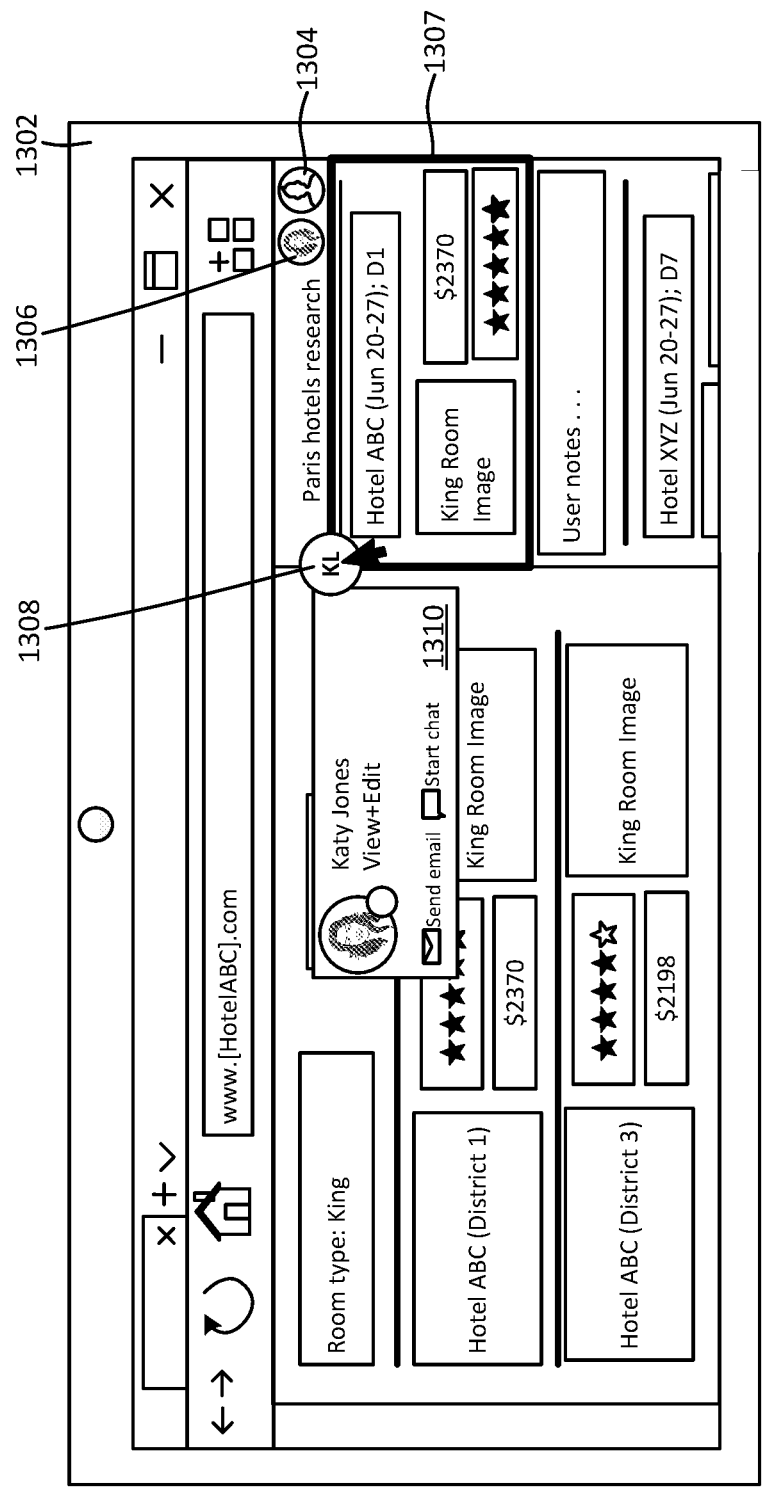
FIG. 13 depicts a computing device displaying a collection of dynamic content that has been shared with another user for collaboration on the collection.

FIG. 13 depicts a computing device displaying a collection of dynamic content that has been shared with another user for collaboration on the collection. In this example, a primary user 1304 has created a "Paris hotels collection" in a web browser. The collection pane for that collection is displayed on the right portion of the web browser user interface on computing device 1302. A hotel webpage for room bookings from Hotel ABC is currently active in the left portion of the web browser, and there is a content set in the "Paris hotels research" collection pane corresponding to that webpage. In this example, the primary user 1304 is the user that created the collection. In some examples, a primary user may grant one or more other users/accounts (secondary users) with access to a collection. The access may be read only access or with access with editing privileges. In some examples, there may be different levels of editing privileges (e.g., can only add notes to a collection, can add notes and new content sets to a collection, can add content sets but not delete content sets, can add content sets and delete content sets, etc.).

In this example, the primary user 1304 has granted a secondary user 1306 (Katy Jones) with access to the "Paris hotels research" collection. In some examples, a user icon for each user that is currently viewing a collection may be displayed in association with a corresponding collection pane. Thus, in this example there are user icons displayed next to the title of the collection. In additional examples, when users concurrently have a collection pane open and/or active the other users' "presence" may be indicated on one or more of the users' open browsers and collection panes. For example, if the secondary user 1306 (Katy Jones) is currently active (editing, modifying, viewing, etc.) in a portion of a collection, such as content set 1307, that portion of the collection may be highlighted, outlined, or otherwise indicated to the primary user on his web browser user interface. In some examples, if an interaction is detected with another user's presence indication (e.g., hover of a mouse over the outlined active area as in the illustrated example, mouse click, etc.), an indication element 1308 may be surfaced that indicates which user is currently active and/or present in that portion of the collection pane. In still additional examples, if an interaction is detected with the indication element 1308, a contact card 1310 for the user corresponding to the indication element 1308 may be surfaced by the web browser application. The contact card may include selectable options for contacting the user (e.g., send email, start chat, etc.) and/or provide an indication of the user's availability.

By allowing users to collaborate on collections concurrently and/or at different times, the systems, methods and devices described herein make collaborative tasks more efficient. For example, users no longer have to copy and past content from various websites into documents, save those documents, and email those documents to other users they would like to collaborate with on a project such as booking travel for an upcoming trip. Users also do not have to wait for the other users to add their comments and edits to the documents and email them back. Memory costs and time associated with saving and emailing those documents are also reduced by the collaboration mechanisms described herein.

Figure 14:
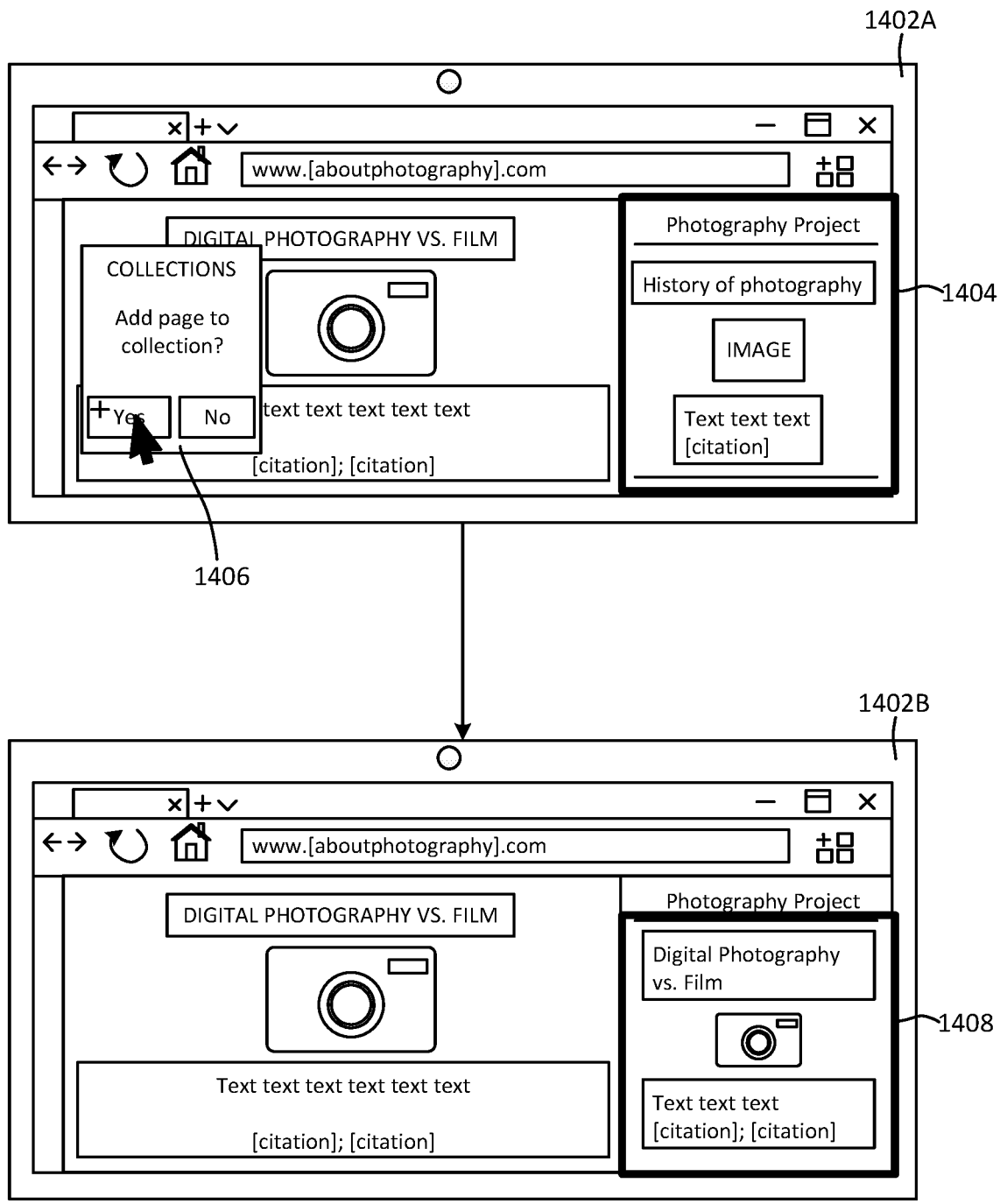
FIG. 14 illustrates the addition of a subset of content from a website to a collection of web content associated with a research project.

FIG. 14 illustrates the addition of a subset of content from a website to a collection of web content associated with a research project. In this example, a web browser is displayed on computing device 1402A. A webpage from the website www.[aboutphotography].com is currently active on the left portion of the web browser. A collection pane 1404 for a "Photography Project" collection is displayed on the right portion of the web browser. In this example, collection pane 1404 displays a single content set for a previously accessed photography webpage related to "History of Photography". The content set for that webpage includes a title: "History of Photography", an image, some textual content associated with that content, and citations for some portion of that textual content. Move to the left portion of the browser, an interaction has been detected to add the current webpage to the "History of Photography" collection. Pop-up window 1406 is then surfaced by the web browser, which states "COLLECTIONS Add page to collection—Yes No". Pop-up window 1406 may be surfaced based on one or more events occurring. For example, pop-up window 1406 may be surfaced based on receiving a selection of the web page URL from the address bar. In another example, pop-up window 1406 may be surfaced based on receiving a right click on the user interface for the website and subsequent selection of an "add to collection" element. Additional events for surfacing pop-up window 1406 are within the scope of this disclosure.

In this example a selection of the "Yes" element is received and web content from the currently active webpage is added to collection pane 1404 as indicated by new content set 1408 displayed on computing device 1402B. In this example, because the currently active website is an informative type webpage, the subset of web content from that webpage that is saved to the collection includes citations for the textual content. As discussed previously, this may be dictated by a rule specifying the type of web content to extract and save to a collection for based on webpage type.

Figure 15:
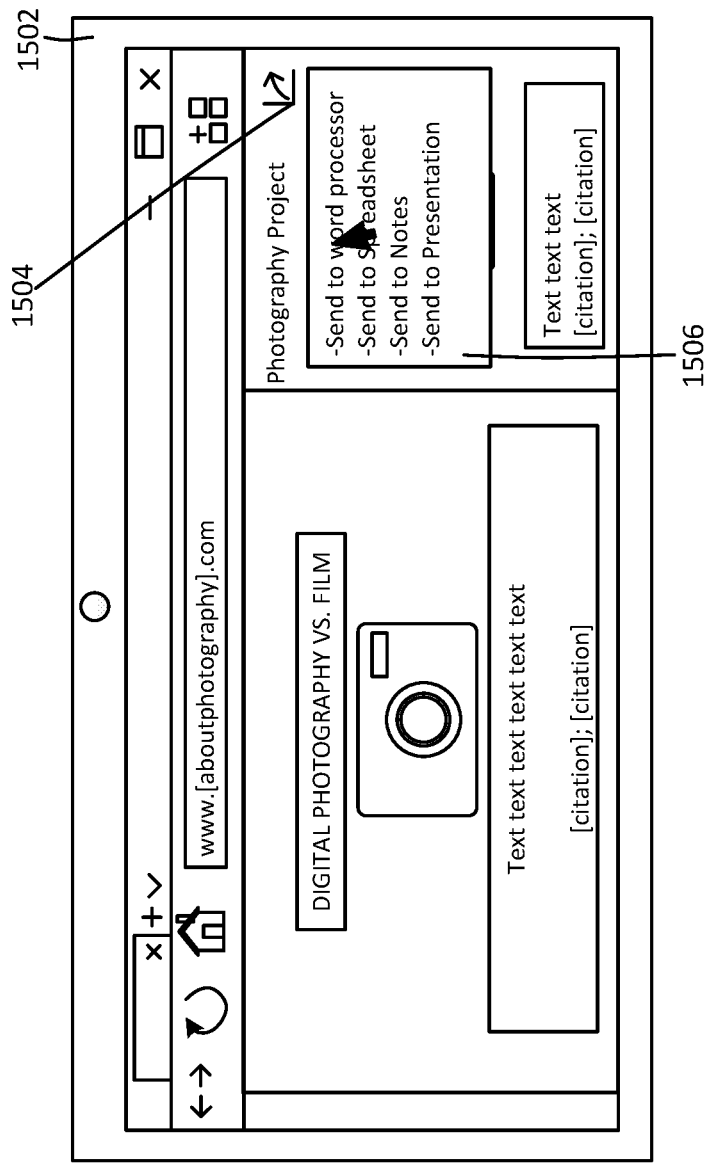
FIG. 15 depicts the utilization of a transformation engine for exporting and transforming a collection of web content from multiple websites in a first format in a collection pane of a web browser, to a second format in a word processing application.

FIG. 15 depicts the utilization of a transformation engine for exporting and transforming a collection of web content from multiple websites in a first format in a collection pane of a web browser, to a second format in a word processing application. In this example, computing device 1502 displays a web browser, with the website www.[aboutphotography9.com open in a left portion of the browser, and a "Photography Project" collection pane open in a right portion of the browser. In this example, the "Photography Project" collection which is displayed in the collection pane of the web browser has two content sets for two different webpages (one corresponding to the active webpage displayed on computing device 1502). Information corresponding to the collection may be exported and transformed for display in other applications. Thus, in this example, a selection is made of collection export user interface element 1504. This selection initiates the display of pop-up window 1506, which has selectable options for exporting and transforming the collection to one of: a word processor application, a spreadsheet application, a notes application, and a presentation application. In this example, a user selects the "Send to word processor" option which initiates the exporting and transforming of the "Photography Project" collection for display in a word processor application as more fully discussed in relation to FIG. 16.

Figure 16:
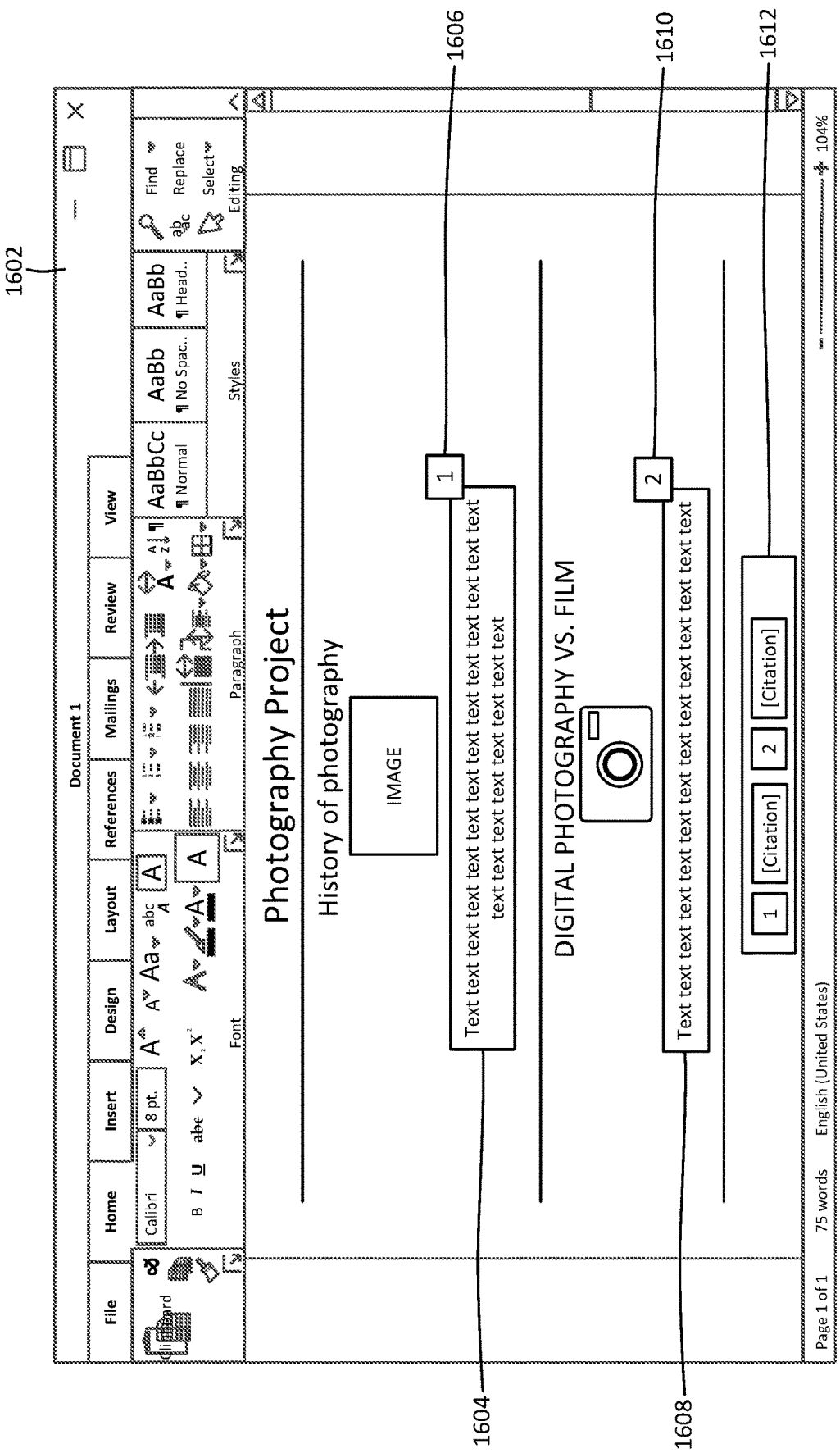
FIG. 16 illustrates the result of the utilization of a transformation engine for exporting and transforming a collection of web content from multiple websites in a first format in a collection pane of a web browser, to a second format in a word processing application.

FIG. 16 illustrates the result of the utilization of a transformation engine for exporting and transforming a collection of web content from multiple websites in a first format in a collection pane of a web browser, to a second format in a word processing application. In this example, the collection "Photography Project" collection discussed in association with FIG. 15 has been exported and transformed and is now displayed in a word processing application user interface 1602. For ease of illustration a computing device is not shown in FIG. 16, but it should be understood that user interface 1602 is being displayed by a computing device.

The word processing document displayed on user interface 1602 includes the title of the corresponding collection at the top of the word processing document (i.e., "Photography Project"). The document also includes the remainder of the subset of web content that was extracted from the two webpages and saved to the "Photography Project" collection. That is, for the first content set in the collection, the document includes the title of the corresponding webpage ("History of Photography"), the primary image of the corresponding webpage, and text 1604 of the corresponding webpage. The document also contains a footnote 1606 for the text 1604. Similarly, for the second content set in the collection, the document includes the title of the corresponding webpage ("DIGITAL PHOTOGRAPHY VS. FILM"), the primary image of the corresponding webpage, and text 1608 of the corresponding webpage. The document also contains a footnote 1610 for the text 1608. At the bottom of the document, the citations 1612 are provided for text 1604 from the first content set, and text 1608 from the second content set. Thus, the arrangement of the content that has been extracted from the collection has been reformatted, with the citations from the two separate content sets of the collection displayed at the bottom of the word processing document.

Figure 17:
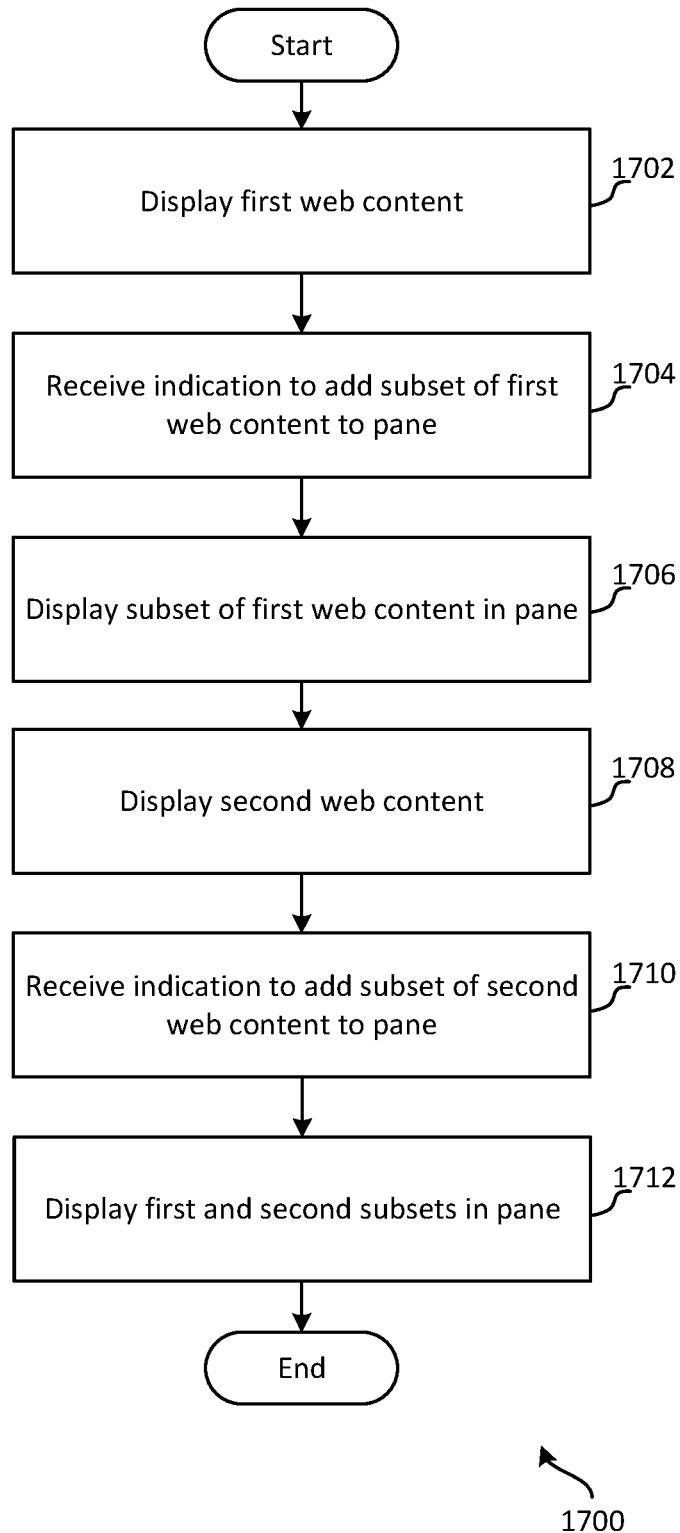
FIG. 17 is an exemplary method for collecting and surfacing web content.

FIG. 17 is an exemplary method 1700 for collecting and surfacing web content. The method 1700 begins at a start operation and flow continues to operation 1702.

At operation 1702 first web content from a first website is accessed and displayed on a web browser application user interface.

From operation 1702 flow continues to operation 1704 where an indication to add a subset of the first web content to a content collection pane integrated in the web browser is received.

From operation 1704 flow continues to operation 1706 where the subset of the first web content is displayed in the content collection pane of the web browser.

From operation 1706 flow continues to operation 1708 where second web content from a second website is accessed and displayed in the web browser application user interface.

From operation 1708 flow continues to operation 1710 where an indication to add a subset of the second web content to the content collection pane is received.

From operation 1710 flow continues to operation 1712 where the subset of the first web content and the subset of the second web content are simultaneously displayed in the content collection pane of the web browser.

From operation 1712 flow moves to an end operation and the method 1700 ends.

Figure 18:
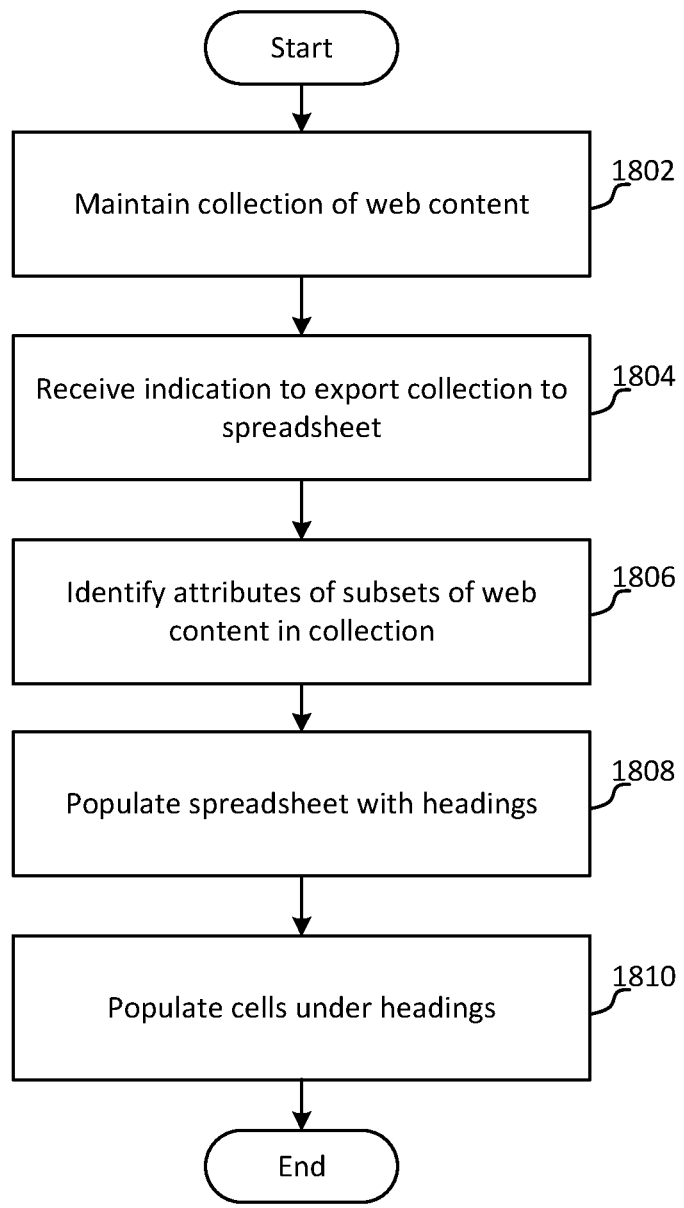
FIG. 18 is an exemplary method for surfacing collected web content.

FIG. 18 is an exemplary method 1800 for surfacing collected web content. The method 1800 begins at a start operation and flow continues to operation 1802.

At operation 1802 a collection of web content may be maintained. The collection of web content may be divided into a plurality of sections and each of the plurality of sections may comprise a subset of web content from a different webpage.

From operation 1802 flow continues to operation 1804 where an indication to export the collection of web content to a spreadsheet application is received.

From operation 1804 flow continues to operation 1806 where a plurality of attributes that each of the plurality of sections have a value for are identified.

From operation 1806 flow continues to operation 1808 where a spreadsheet is populated with headings corresponding to each of the plurality of attributes.

From operation 1808 flow continues to operation 1810 where cells under the headings are populated with corresponding values for each of the plurality of sections.

From operation 1810 flow moves to an end operation and the method 1800 ends.

Figure 19:
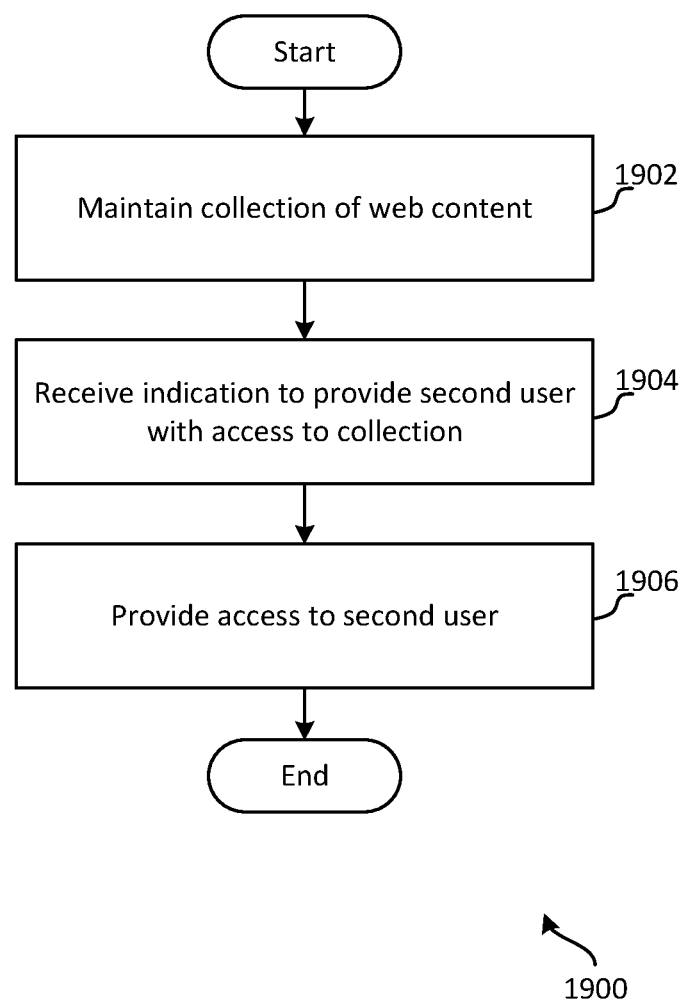
FIG. 19 is an exemplary method for sharing collected web content.

FIG. 19 is an exemplary method 1900 for sharing collected web content. The method 1900 begins at a start operation and flow moves to operation 1902.

At operation 1902 a collection of web content is maintained. The collection of web content may be divided into a plurality of sections and each of the plurality of sections may comprise a subset of web content from a different webpage. In examples, a first user may have administrative rights associated with the collection of web content.

From operation 1902 flow continues to operation 1904 where an indication to provide a second user with access to the collection of web content is received.

From operation 1904 flow continues to operation 1906 where the second user is provided with access to the collection of web content.

From operation 1906 flow moves to an end operation and the method 1900 ends.

Figure 20:
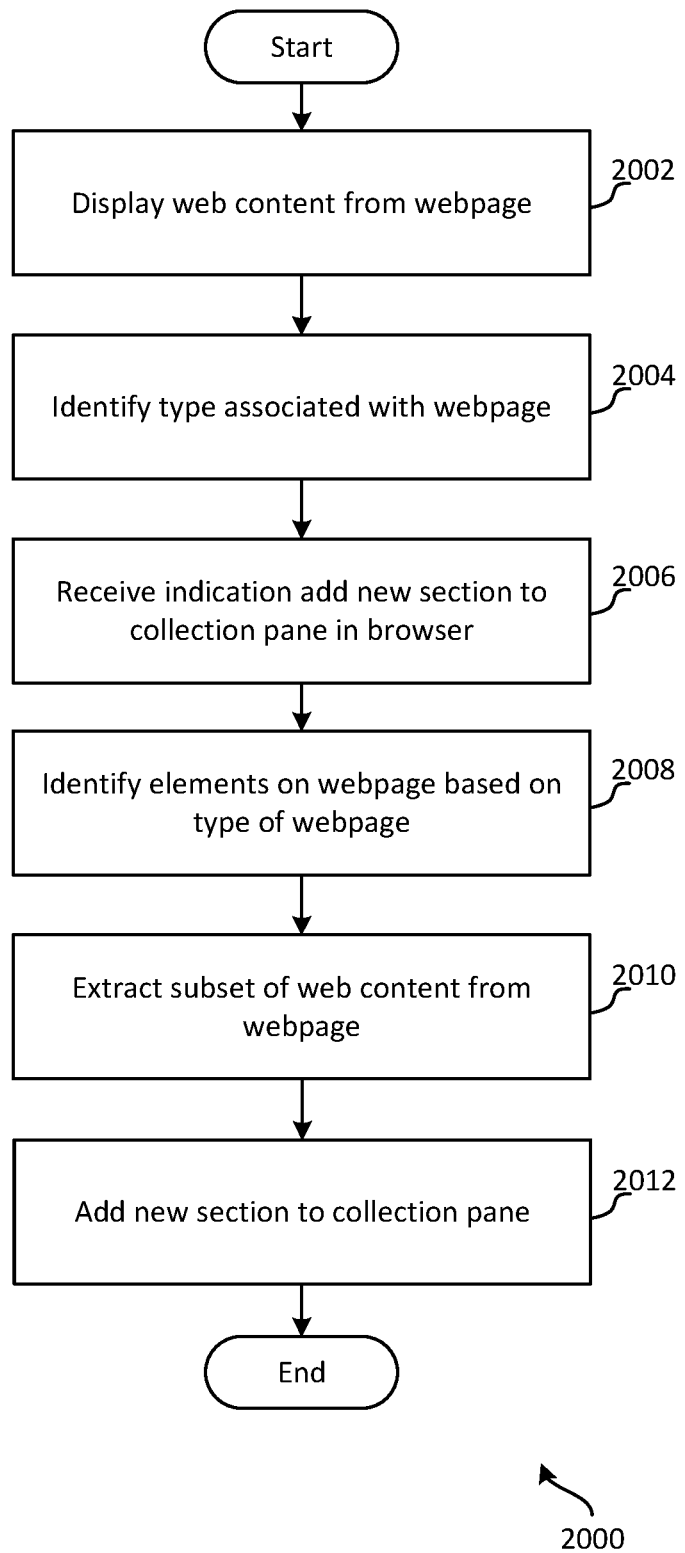
FIG. 20 is an exemplary method for collecting and surfacing web content.

FIG. 20 is an exemplary method 2000 for collecting and surfacing web content. The method 2000 begins at a start operation and flow moves to operation 2002.

At operation 2002 web content from a webpage is displayed in a web browser.

From operation 2002 flow continues to operation 2004 where a type associated with the webpage is identified.

From operation 2004 flow continues to operation 2006 where an indication to add a new section corresponding to the webpage to a content collection pane integrated in the web browser is received.

From operation 2006 flow continues to operation 2008 where a plurality of elements on the webpage are identified based on the identified type associated with the webpage.

From operation 2008 flow continues to operation 2010 where a subset of web content corresponding to the plurality of elements is extracted from the webpage.

From operation 2010 flow continues to operation 2012 where the new section is added to the content collection pane. The new section comprises the subset of web content extracted from the webpage.

From operation 2012 flow continues to an end operation and the method 2000 ends.

Figure 21:
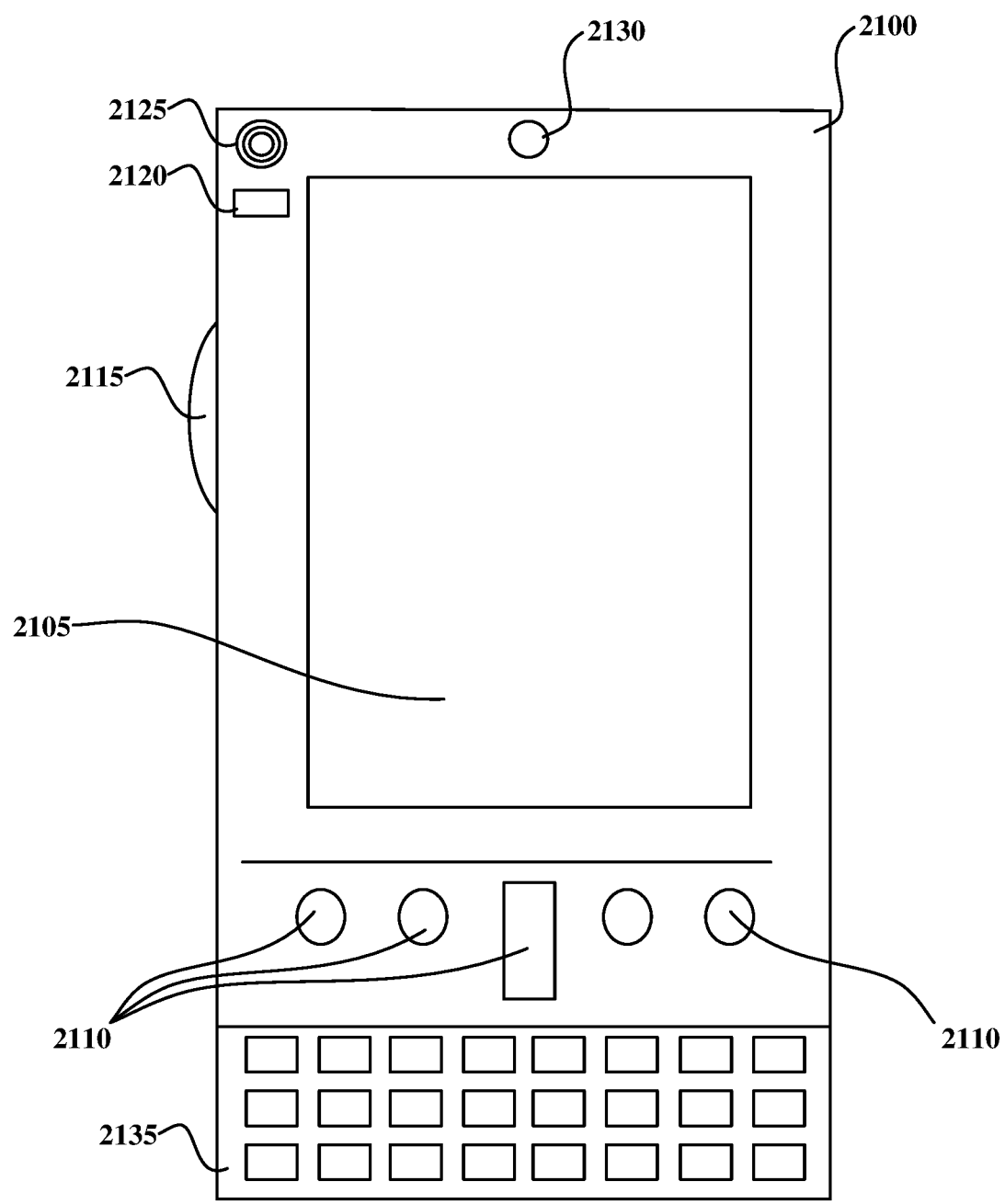
FIGS. 21 and 22 are simplified diagrams of a mobile computing device with which aspects of the disclosure may be practiced.
Figure 22:
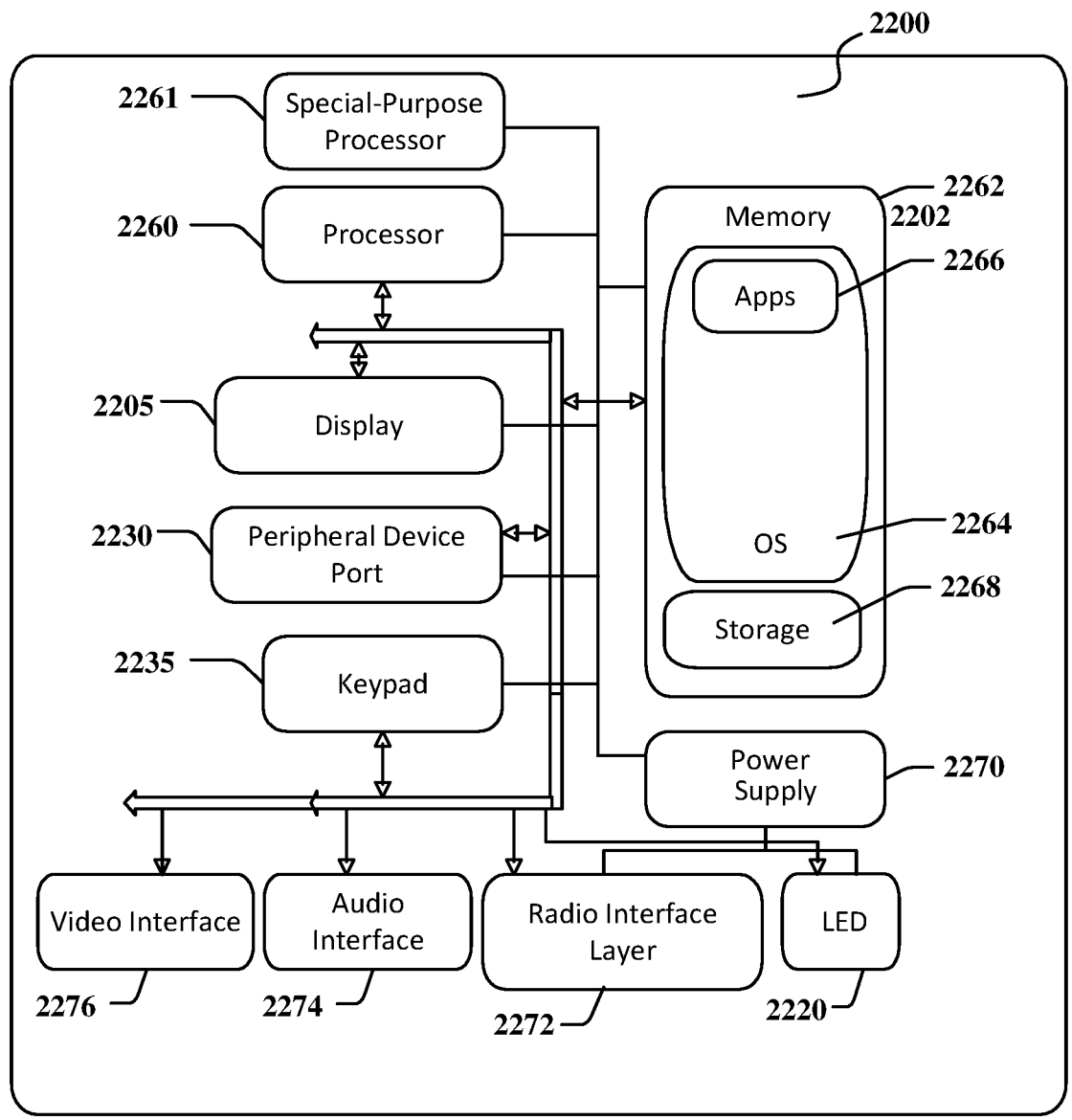

FIGS. 21 and 22 illustrate a mobile computing device 2100, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 21, one aspect of a mobile computing device 2100 for implementing the aspects is illustrated. In a basic configuration, the mobile computing device 2100 is a handheld computer having both input elements and output elements. The mobile computing device 2100 typically includes a display 2105 and one or more input buttons 2110 that allow the user to enter information into the mobile computing device 2100. The display 2105 of the mobile computing device 2100 may also function as an input device (e.g., a touch screen display). If included, an optional side input element 2115 allows further user input. The side input element 2115 may be a rotary switch, a button, or any other type of manual input element. In alternative aspects, mobile computing device 2100 may incorporate more or fewer input elements. For example, the display 2105 may not be a touch screen in some embodiments. In yet another alternative embodiment, the mobile computing device 2100 is a portable phone system, such as a cellular phone. The mobile computing device 2100 may also include an optional keypad 2135. Optional keypad 2135 may be a physical keypad or a "soft" keypad generated on the touch screen display. In various embodiments, the output elements include the display 2105 for showing a graphical user interface (GUI), a visual indicator 2120 (e.g., a light emitting diode), and/or an audio transducer 2125 (e.g., a speaker). In some aspects, the mobile computing device 2100 incorporates a vibration transducer for providing the user with tactile feedback. In yet another aspect, the mobile computing device 2100 incorporates input and/or output ports, such as an audio input (e.g., a microphone jack), an audio output (e.g., a headphone jack), and a video output (e.g., a HDMI port) for sending signals to or receiving signals from an external device.

FIG. 22 is a block diagram illustrating the architecture of one aspect of a mobile computing device. That is, the mobile computing device 2200 can incorporate a system (e.g., an architecture) 2202 to implement some aspects. In one embodiment, the system 2202 is implemented as a "smart phone" capable of running one or more applications (e.g., browser, e-mail, calendaring, contact managers, messaging clients, games, and media clients/players). In some aspects, the system 2202 is integrated as a computing device, such as an integrated personal digital assistant (PDA) and wireless phone.

One or more application programs 2266 may be loaded into the memory 2262 and run on or in association with the operating system 2264. Examples of the application programs include phone dialer programs, e-mail programs, personal information management (PIM) programs, word processing programs, spreadsheet programs, Internet browser programs, messaging programs, and so forth. The system 2202 also includes a non-volatile storage area 2268 within the memory 2262. The non-volatile storage area 2268 may be used to store persistent information that should not be lost if the system 2202 is powered down. The application programs 2266 may use and store information in the non-volatile storage area 2268, such as e-mail or other messages used by an e-mail application, and the like. A synchronization application (not shown) also resides on the system 2202 and is programmed to interact with a corresponding synchronization application resident on a host computer to keep the information stored in the non-volatile storage area 2268 synchronized with corresponding information stored at the host computer. As should be appreciated, other applications may be loaded into the memory 2262 and run on the mobile computing device 700, including instructions for providing and operating a cross-device resources collaboration application.

The system 2202 has a power supply 2270, which may be implemented as one or more batteries. The power supply 2270 might further include an external power source, such as an AC adapter or a powered docking cradle that supplements or recharges the batteries.

The system 2202 may also include a radio interface layer 2272 that performs the function of transmitting and receiving radio frequency communications. The radio interface layer 2272 facilitates wireless connectivity between the system 2202 and the "outside world," via a communications carrier or service provider. Transmissions to and from the radio interface layer 2272 are conducted under control of the operating system 2264. In other words, communications received by the radio interface layer 2272 may be disseminated to the application programs 2266 via the operating system 2264, and vice versa.

The visual indicator 2120 may be used to provide visual notifications, and/or an audio interface 2274 may be used for producing audible notifications via the audio transducer 2125. In the illustrated embodiment, the visual indicator 2120 is a light emitting diode (LED) and the audio transducer 2125 is a speaker. These devices may be directly coupled to the power supply 2270 so that when activated, they remain on for a duration dictated by the notification mechanism even though the processor 2260 and other components might shut down for conserving battery power. The LED may be programmed to remain on indefinitely until the user takes action to indicate the powered-on status of the device. The audio interface 2274 is used to provide audible signals to and receive audible signals from the user. For example, in addition to being coupled to the audio transducer 2125, the audio interface 2274 may also be coupled to a microphone to receive audible input, such as to facilitate a telephone conversation. In accordance with embodiments of the present disclosure, the microphone may also serve as an audio sensor to facilitate control of notifications, as will be described below. The system 2202 may further include a video interface 2276 that enables an operation of an on-board camera 2130 to record still images, video stream, and the like.

A mobile computing device 2200 implementing the system 2202 may have additional features or functionality. For example, the mobile computing device 700 may also include additional data storage devices (removable and/or non-removable) such as, magnetic disks, optical disks, or tape. Such additional storage is illustrated in FIG. 22 by the non-volatile storage area 2268.

Data/information generated or captured by the mobile computing device 2200 and stored via the system 2202 may be stored locally on the mobile computing device 2200, as described above, or the data may be stored on any number of storage media that may be accessed by the device via the radio interface layer 2272 or via a wired connection between the mobile computing device 2200 and a separate computing device associated with the mobile computing device 2200, for example, a server computer in a distributed computing network, such as the Internet. As should be appreciated such data/information may be accessed via the mobile computing device 2200 via the radio interface layer 2272 or via a distributed computing network. Similarly, such data/information may be readily transferred between computing devices for storage and use according to well-known data/information transfer and storage means, including electronic mail and collaborative data/information sharing systems.

Figure 23:
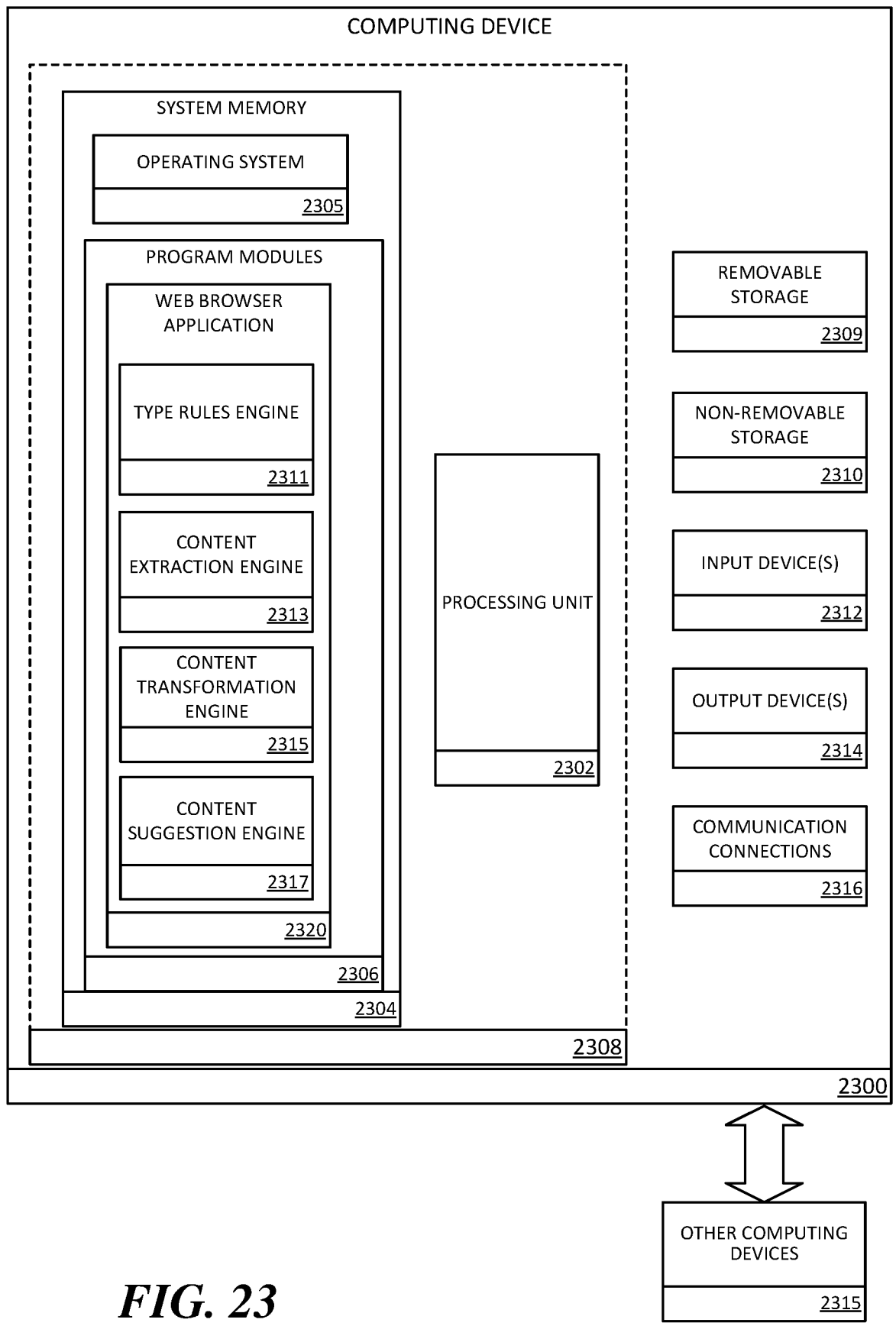
FIG. 23 is a block diagram illustrating example physical components of a computing device with which aspects of the disclosure may be practiced.

FIG. 23 is a block diagram illustrating physical components (e.g., hardware) of a computing device 2300 with which aspects of the disclosure may be practiced. The computing device components described below may have computer executable instructions for assisting with collecting and surfacing web content. In a basic configuration, the computing device 2300 may include at least one processing unit 2302 and a system memory 2304. Depending on the configuration and type of computing device, the system memory 2304 may comprise, but is not limited to, volatile storage (e.g., random access memory), non-volatile storage (e.g., read-only memory), flash memory, or any combination of such memories. The system memory 2304 may include an operating system 2305 suitable for running one or more web browser and/or collection programs. The operating system 2305, for example, may be suitable for controlling the operation of the computing device 2300. Furthermore, embodiments of the disclosure may be practiced in conjunction with a graphics library, other operating systems, or any other application program and is not limited to any particular application or system. This basic configuration is illustrated in FIG. 23 by those components within a dashed line 2308. The computing device 2300 may have additional features or functionality. For example, the computing device 2300 may also include additional data storage devices (removable and/or non-removable) such as, for example, magnetic disks, optical disks, or tape. Such additional storage is illustrated in FIG. 23 by a removable storage device 2309 and a non-removable storage device 2310.

As stated above, a number of program modules and data files may be stored in the system memory 2304. While executing on the processing unit 2302, the program modules 2306 (e.g., web browser application 820) may perform processes including, but not limited to, the aspects, as described herein. According to examples, type rules engine 2311 may perform one or more operations associated with identifying a type of website and/or webpage of a currently active webpage (e.g., product type, travel type, etc.). Content extraction engine 2313 may perform one or more operations associated with extracting content from a webpage based on an identified type associated with that webpage according to a set of type rules. Content transformation engine 2315 may perform one or more operations associated with exporting and transforming data from a collection and/or collection pane for integration and display in one or more other productivity applications (e.g., word processing application, spreadsheet application, notes application, etc.). Content suggestion engine 2317 may perform one or more operations associated with identifying websites and/or webpages that are relevant to a user based on one or more of the user's collections, and suggesting those websites and/or webpages to the user.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 2300 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 2300 may also have one or more input device(s) 2312 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 2316 allowing communications with other computing devices 2350. Examples of suitable communication connections 2316 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 2304, the removable storage device 2309, and the non-removable storage device 2310 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 2300. Any such computer storage media may be part of the computing device 2300. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 24:
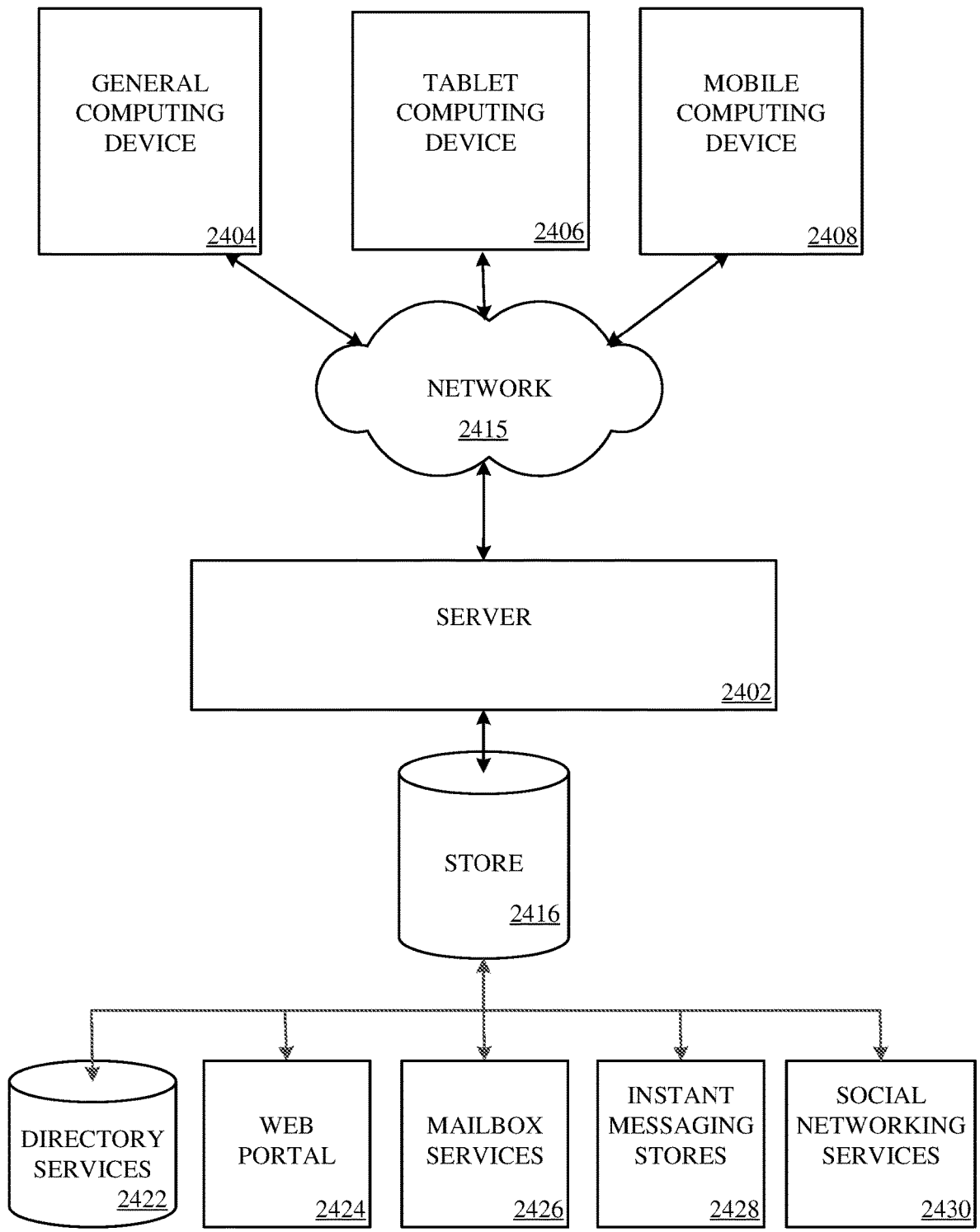
FIG. 24 is a simplified block diagram of a distributed computing system in which aspects of the present disclosure may be practiced.

FIG. 24 illustrates one aspect of the architecture of a system for processing data received at a computing system from a remote source, such as a personal/general computer 2404, tablet computing device 2406, or mobile computing device 2408, as described above. Content displayed at server device 2402 may be stored in different communication channels or other storage types. For example, various documents may be stored using a directory service 2422, a web portal 2424, a mailbox service 2426, an instant messaging store 2428, or a social networking site 2430. The program modules 2306 may be employed by a client that communicates with server device 2402, and/or the program modules 2306 may be employed by server device 2402. The server device 2402 may provide data to and from a client computing device such as a personal/general computer 2404, a tablet computing device 2406 and/or a mobile computing device 2408 (e.g., a smart phone) through a network 2415. By way of example, the computer system described above with respect to FIGS. 21-23 may be embodied in a personal/general computer 2404, a tablet computing device 2406 and/or a mobile computing device 2408 (e.g., a smart phone). Any of these embodiments of the computing devices may obtain content from the store 2416, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method for surfacing collected web content, the method comprising:
    maintaining a collection of web content selected by a user during web browsing for inclusion in the collection, the collection comprising:
        a first subset of web content from a first webpage, the first subset of web content comprising a first attribute with a first value, and a second subset of web content from a second webpage, the second subset of web content comprising a second attribute with a second value;

displaying the collection of web content in a collection pane of a web browser application;

receiving an indication, via the web browser application, to export the collection of web content to a productivity application;

determining a collection type of the collection of web content based on the first attribute and the second attribute; and using one or more rules associated with the collection type to populate information in the productivity application, the information comprising at least a portion of the first subset of web content and at least a portion of the second subset of web content.

2. The method of claim 1, wherein the at least the portion of the first subset of web content comprises a first heading corresponding to the first attribute and the at least the portion of the second subset of web content comprises a second heading corresponding to the second attribute.

3. The method of claim 2, wherein using one or more rules associated with the collection type to populate the information in the productivity application comprises:

extracting the first value;

populating the first value under the first heading in the productivity application;

extracting the second value; and populating the second value under the second heading in the productivity application.

4. The method of claim 1, wherein the one or more rules specify:

identifying a plurality of attributes that the first subset of web content and the second subset of web content have in common; and utilizing those attributes for populating headings in the productivity application.

5. The method of claim 1, wherein the one or more rules are customizable by a user for populating custom headings for one or more collection types.

6. The method of claim 1, further comprising:

displaying the collection of web content in a collection pane; and displaying a link in the collection pane, wherein the link is selectable for accessing a document generated by the productivity application.

7. The method of claim 6, wherein the document is a spreadsheet and the productivity application is a spreadsheet application.

8. The method of claim 1, further comprising:

determining that information included in the first subset of web content has been modified at the first webpage; and updating, in response to the determination that the information included in the first subset of web content has been modified at the first webpage, corresponding content in a document of the productivity application.

9. The method of claim 1, further comprising:

determining that information included in the first subset of web content has been modified at the first webpage; and sending a notification to a user account associated with the collection of web content indicating that the first subset of web content has been modified.

10. The method of claim 1, further comprising:

receiving a first user input, from a first user account, to add the first subset of web content from the first webpage to a first section of the displayed collection pane, wherein the first subset of web content comprises the first attribute and the first value for the first attribute;

extracting the first attribute and the first value for the first attribute and adding them to the first section of the collection pane;

receiving a second user input, from the first user account, to add the second subset of web content from the second webpage to a second section of the collection pane, wherein the second subset of web content comprises the second attribute and the second value for the second attribute;

extracting the second attribute and the second value for the second attribute and adding them to a second section of the collection pane; and saving the first subset of web content in the first section of the collection pane, and the second subset of web content in the second section of the collection pane, as the collection of web content.

11. A system for surfacing collected web content, comprising:

a memory for storing executable program code; and one or more processors, functionally coupled to the memory, the one or more processors being responsive to computer-executable instructions contained in the executable program code and operative to:

maintain a collection of web content selected by a user during web browsing for inclusion in the collection, the collection comprising:

a first subset of web content from a first webpage, the first subset of web content comprising a first attribute with a first value, and a second subset of web content from a second webpage, the second subset of web content comprising a second attribute with a second value;

display the collection of web content in a collection pane of a web browser application;

receive an indication, via the web browser application, to export the collection of web content to a productivity application;

determine a collection type of the collection of web content based on the first attribute and the second attribute; and use one or more rules associated with the collection type to populate information in the productivity application, the information comprising at least a portion of the first subset of web content and at least a portion of the second subset of web content.

12. The system of claim 11, wherein the at least the portion of the first subset of web content comprises a first heading corresponding to the first attribute and the at least the portion of the second subset of web content comprises a second heading corresponding to the second attribute.

13. The system of claim 12, wherein in using one or more rules associated with the collection type to populate the information in the productivity application, the one or more processors are further responsive to the computer-executable instructions contained in the executable program code and operative to:

extract the first value;

populate the first value under the first heading in the productivity application;

extract the second value; and populate the second value under the second heading in the productivity application.

14. The system of claim 11, wherein the one or more rules specify:

identifying a plurality of attributes that the first subset of web content and the second subset of web content have in common; and utilizing those attributes for populating headings in the productivity application.

15. The system of claim 11, wherein the one or more rules are customizable by a user for populating custom headings for one or more collection types.

16. The system of claim 11, wherein the one or more processors are further responsive to the computer-executable instructions contained in the executable program code and operative to:

receive a first user input, from a first user account, to add the first subset of web content from the first webpage to a first section of the collection pane, wherein the first subset of web content comprises the first attribute and the first value for the first attribute;

extract the first attribute and the first value for the first attribute and adding them to the first section of the collection pane;

receive a second user input, from the first user account, to add the second subset of web content from the second webpage to a second section of the collection pane, wherein the second subset of web content comprises the second attribute and the second value for the second attribute;

extract the second attribute and the second value for the second attribute and adding them to a second section of the collection pane; and save the first subset of web content in the first section of the collection pane, and the second subset of web content in the second section of the collection pane, as the collection of web content.

17. A computer-readable storage device comprising executable instructions that, when executed by one or more processors, assists with accessing collected web content, the computer-readable storage device including instructions executable by the one or more processors for:

accessing a collection of web content selected by a user during web browsing for inclusion in the collection, the collection comprising:

a first subset of web content from a first webpage, the first subset of web content comprising a first attribute with a first value, and a second subset of web content from a second webpage, the second subset of web content comprising a second attribute with a second value;

displaying the collection of web content in a collection pane of a web browser application;

receiving an indication, via the web browser application, to export the collection of web content to a productivity application;

determining a collection type of the collection of web content based on the first attribute and the second attribute; and using one or more rules associated with the collection type to populate information in the productivity application, the information comprising at least a portion of the first subset of web content and at least a portion of the second subset of web content.

18. The computer-readable storage device of claim 17, wherein the at least the portion of the first subset of web content comprises a first heading corresponding to the first attribute and the at least the portion of the second subset of web content comprises a second heading corresponding to the second attribute.

19. The computer-readable storage device of claim 17, wherein in using one or more rules associated with the collection type to populate the information in the productivity application, the instructions are further executable by the one or more processors for:

extracting the first value;

populating the first value under a first heading in the productivity application;

extracting the second value; and populating the second value under a second heading in the productivity application.

20. The computer-readable storage device of claim 17, wherein the one or more rules specify:

identifying a plurality of attributes that the first subset of web content and the second subset of web content have in common; and utilizing those attributes for populating headings in the productivity application.

* * * * *